(12) United States Patent
Yi et al.

(10) Patent No.: US 10,644,818 B2
(45) Date of Patent: May 5, 2020

(54) METHOD AND APPARATUS FOR PERFORMING MINI-SUBFRAME BASED ALIGNMENT FOR NEW RADIO ACCESS TECHNOLOGY IN WIRELESS COMMUNICATION SYSTEM

(71) Applicant: LG ELECTRONICS INC., Seoul (KR)

(72) Inventors: Yunjung Yi, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 16/067,558

(22) PCT Filed: Jul. 12, 2017

(86) PCT No.: PCT/KR2017/007475
§ 371 (c)(1),
(2) Date: Jun. 29, 2018

(87) PCT Pub. No.: WO2018/012882
PCT Pub. Date: Jan. 18, 2018

(65) Prior Publication Data
US 2019/0007152 A1 Jan. 3, 2019

Related U.S. Application Data

(60) Provisional application No. 62/361,484, filed on Jul. 12, 2016, provisional application No. 62/373,959, (Continued)

(51) Int. Cl.
*H04W 4/00* (2018.01)
*H04J 3/16* (2006.01)
(Continued)

(52) U.S. Cl.
CPC .......... *H04J 3/1605* (2013.01); *H04L 5/0007* (2013.01); *H04L 5/0028* (2013.01);
(Continued)

(58) Field of Classification Search
CPC .... H04J 3/1605; H04L 5/0048; H04L 5/0007; H04L 5/0092; H04L 27/2602; H04L 27/26; H04L 5/023; H04L 5/0051; H04L 5/0028
(Continued)

(56) References Cited

U.S. PATENT DOCUMENTS 9,820,281 B1 * 11/2017 Werner ................ H04L 5/0007
2016/0087774 A1 3/2016 Guo et al.
(Continued)

OTHER PUBLICATIONS

PCT International Application No. PCT/KR2017/007475, Written Opinion of the International Searching Authority dated Oct. 19, 2017, 2 pages.
(Continued)

*Primary Examiner* — Chuong T Ho
(74) *Attorney, Agent, or Firm* — Lee Hong Degerman Kang Waimey

(57) ABSTRACT

A method and apparatus for multiplexing different numerologies in a wireless communication system is provided. A network node divides a scheduling unit into a plurality of basic time resource units in time domain, and multiplexes multiple numerologies by unit of a basic time resource unit. The basic time resource unit for the multiple numerologies may be aligned with each other at a basic time resource unit level or a subframe level.

15 Claims, 23 Drawing Sheets

Related U.S. Application Data filed on Aug. 11, 2016, provisional application No. 62/403,034, filed on Sep. 30, 2016.

(51) Int. Cl.
*H04L 5/00* (2006.01)
*H04L 27/26* (2006.01)
*H04L 5/02* (2006.01)

(52) U.S. Cl.
CPC .......... *H04L 5/0048* (2013.01); *H04L 5/0051* (2013.01); *H04L 5/023* (2013.01); *H04L 27/26* (2013.01); *H04L 27/2602* (2013.01); *H04L 5/0092* (2013.01)

(58) Field of Classification Search
USPC .......................... 370/329, 330, 335, 336, 337
See application file for complete search history.

(56) References Cited

U.S. PATENT DOCUMENTS

| | | | | |
|---|---|---|---|---|
| 2016/0352551 | A1* | 12/2016 | Zhang | H04L 5/0007 |
| 2017/0244535 | A1* | 8/2017 | Islam | H04B 7/2615 |
| 2017/0310431 | A1* | 10/2017 | Iyer | H04L 1/1816 |
| 2017/0311276 | A1* | 10/2017 | Tsai | H04B 7/0617 |
| 2017/0325250 | A1* | 11/2017 | Manolakos | H04L 27/2602 |
| 2017/0332359 | A1* | 11/2017 | Tsai | H04B 7/0617 |
| 2017/0359791 | A1* | 12/2017 | Onggosanusi | H04L 27/2613 |
| 2017/0366311 | A1* | 12/2017 | Iyer | H04B 7/0482 |
| 2018/0035416 | A1* | 2/2018 | Yi | H04L 5/0037 |
| 2019/0075006 | A1* | 3/2019 | Yi | H04L 5/0007 |
| 2019/0103931 | A1* | 4/2019 | Yi | H04W 56/00 |
| 2019/0288809 | A1* | 9/2019 | Iyer | H04L 1/1893 |

OTHER PUBLICATIONS

CATT, "Discussion of NR Numerology," 3GPP TSG-RAN WG1 #85, R1-164249, May 2016, 7 pages.

LG Electronics, "Discussion on frame structure for NR," 3GPP TSG-RAN WG1 #85, R1-164560, May 2016, 10 pages.

Qualcomm Incorporated, "Numerology and TTI multiplexing for NR Forward Compatibility Analysis," 3GPP TSG-RAN WG1 #85, R1-164692, May 2016, 10 pages.

KT Corp., Verizon Wireless, "Discussion on NR numerology," 3GPP TSG-RAN WG1 #85, R1-165525, May 2016, 7 pages.

* cited by examiner

SC0/4

SC0/2 base (SC0), mini SF, SF

2*SC0

4*SC0

SC0/4 →

SC0/2 → base (SC0) → mini SF

SF

2*SC0 →

4*SC0 →

METHOD AND APPARATUS FOR PERFORMING MINI-SUBFRAME BASED ALIGNMENT FOR NEW RADIO ACCESS TECHNOLOGY IN WIRELESS COMMUNICATION SYSTEM

CROSS-REFERENCE TO RELATED APPLICATIONS

This application is the National Stage filing under 35 U.S.C. 371 of International Application No. PCT/KR2017/007475, filed on Jul. 12, 2017, which claims the benefit of U.S. Provisional Application Nos. 62/361,484, filed on Jul. 12, 2016, 62/373,959, filed on Aug. 11, 2016, and 62/403,034, filed on Sep. 30, 2016, the contents of which are all hereby incorporated by reference herein in their entirety.

BACKGROUND OF THE INVENTION

Field of the Invention

The present invention relates to wireless communications, and more particularly, to a method and apparatus for performing mini-subframe based alignment for a new radio access technology (NR) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (new RAT or NR) for convenience.

In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed.

SUMMARY OF THE INVENTION

The present invention provides a method and apparatus for performing mini-subframe based alignment for a new radio access technology (NR) in a wireless communication system.

In an aspect, a method for multiplexing different numerologies by a network node in a wireless communication system is provided. The method includes dividing a scheduling unit into a plurality of basic time resource units in time domain, and multiplexing multiple numerologies by unit of a basic time resource unit.

In another aspect, a network node in a wireless communication system is provided.

The network node includes a memory, a transceiver, and a processor, coupled to the memory and the transceiver, that divides a scheduling unit into a plurality of basic time resource units in time domain, and multiplexes multiple numerologies by unit of a basic time resource unit.

Different numerologies can be multiplexed in a scheduling unit efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
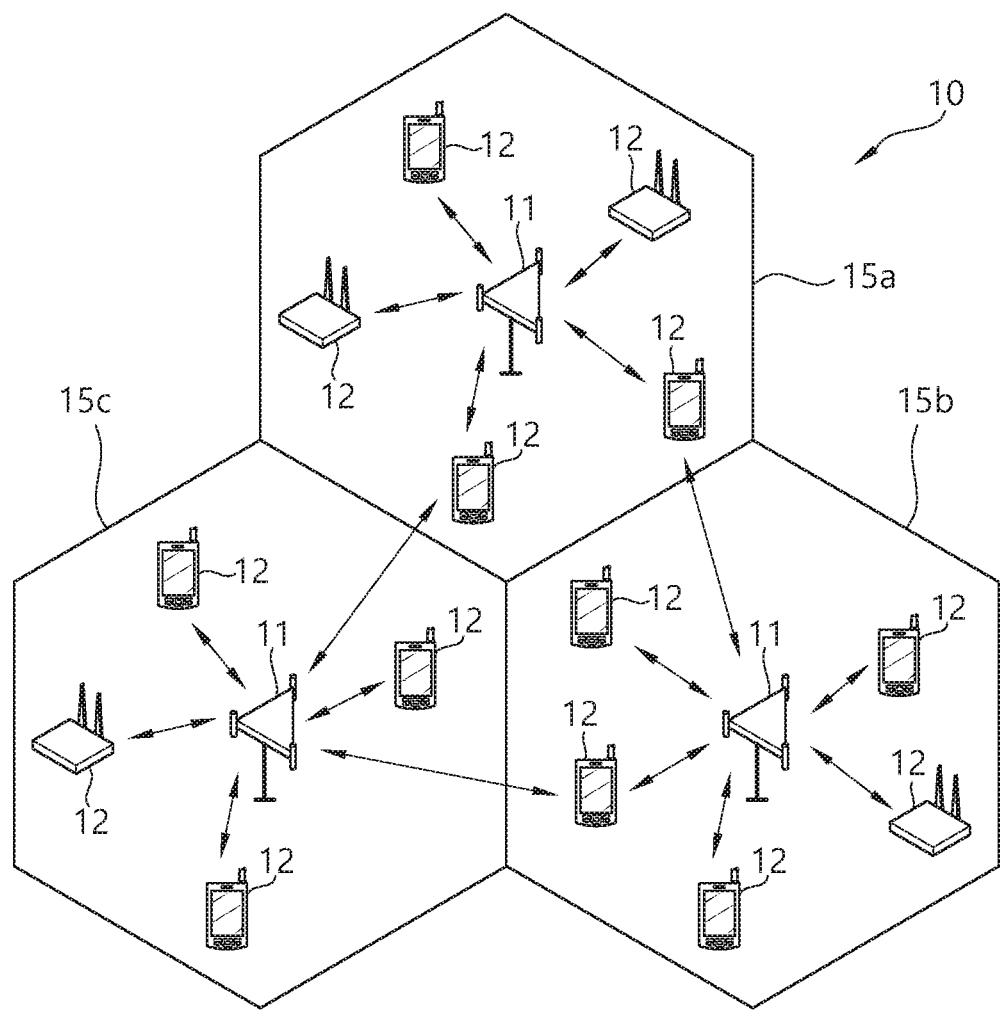
FIG. 1 shows a wireless communication system.

FIG. 1 shows a wireless communication system. The wireless communication system 10 includes at least one eNodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
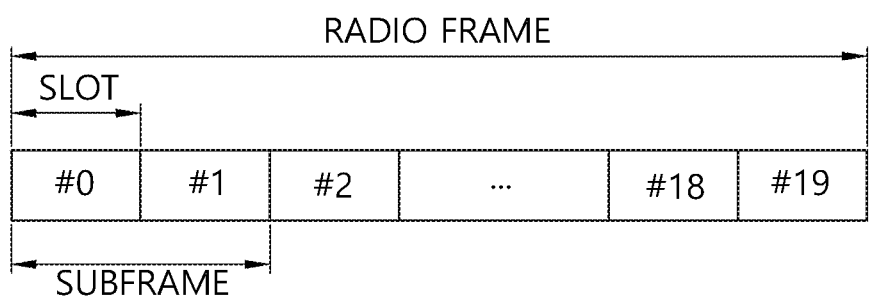
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 3:
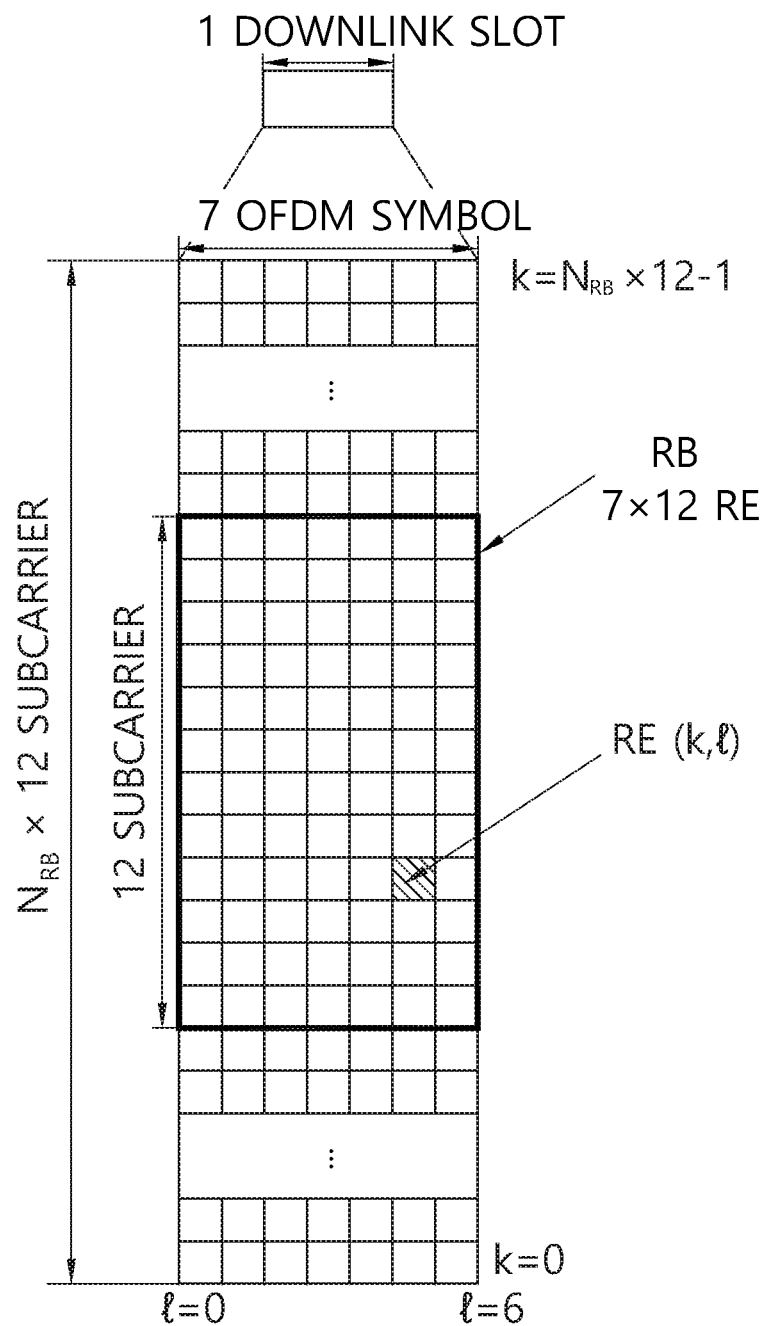
FIG. 3 shows a resource grid for one downlink slot.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-advanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

Figure 4:
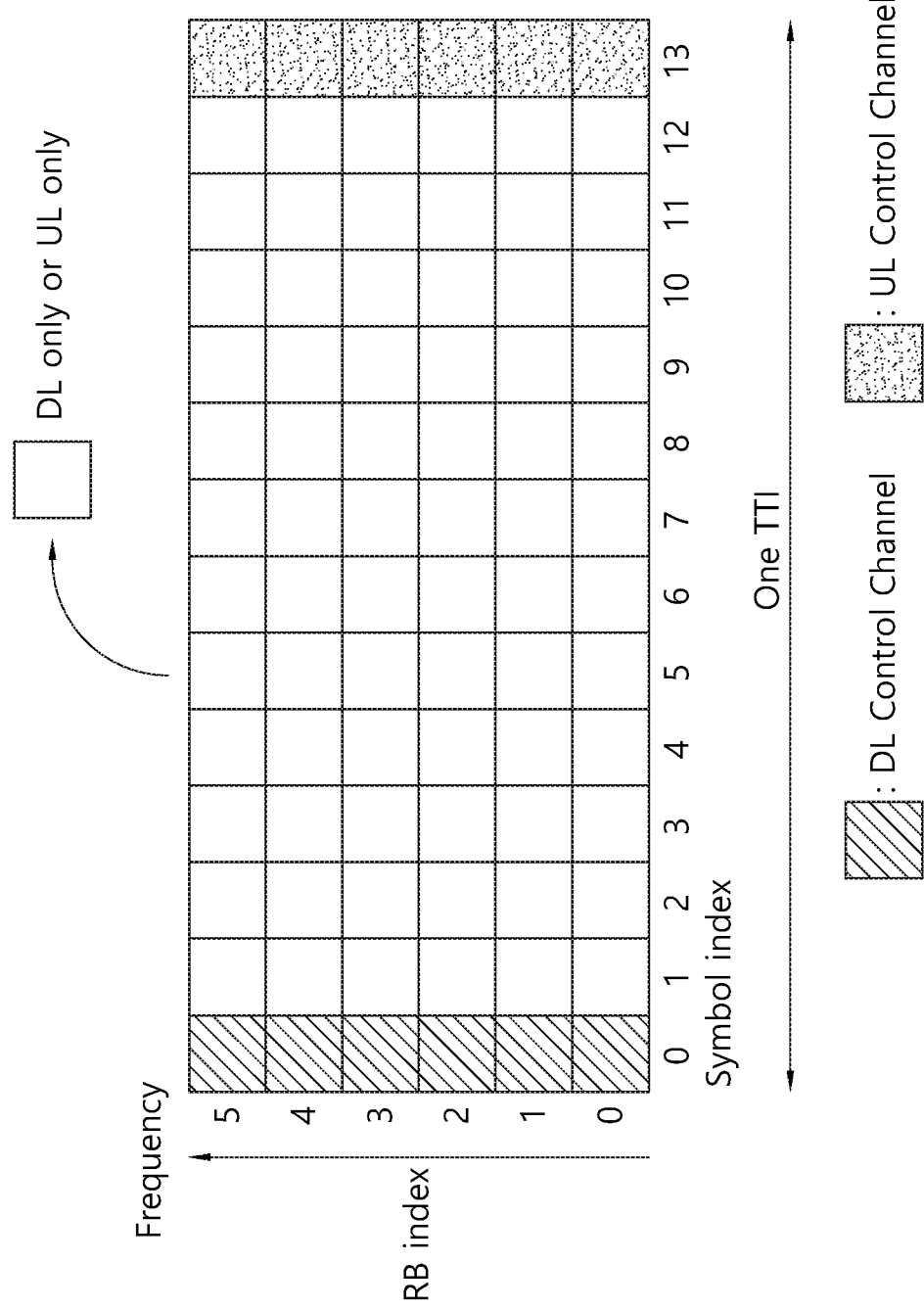
FIG. 4 shows an example of subframe type for NR.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

In NR, different TTI lengths from different numerology and/or number of OFDM symbols are expected to be supported. As there are different cases of multiplexing (such as carrier aggregation (CA), dual connectivity (DC), sharing between relay and access links, enhanced mobile broadband (eMBB) and ultra-reliable low-latency communication (URLLC) multiplexing in a carrier, different numerology used in DL and UL, etc.), alignment between different TTI length may become more important. Furthermore, supporting reference signal (RS) in different TTI which may have common design may also need to be considered.

The present invention focuses on subframe alignment in different cases, and its associated RS pattern. More particularly, the present invention focuses on the case where subframe alignments are achieved at mini-subframe of base numerology among multiplexed services/carriers.

1. Base Subframe Formation

In In determining base numerology, at least one of the following approaches may be considered.

Numerology derived from initial synchronization of primary cell (PCell) or primary carrier may be used as base numerology.

If different services are multiplexed in a carrier, numerology derived from initial synchronization of the carrier may be used as base numerology.

Numerology derived from initial synchronization of the access link or backhaul link may be used as base numerology if access and backhaul link shares the medium.

Base numerology may be higher layer configured via system information and/or

There may be multiple base numerologies in a single carrier, where each is derived from initial synchronization signal of each service in the single carrier.

Base numerology may be a numerology used for physical broadcast channel (PBCH) and/or system information block (SIB), such as remaining system information (RMSI).

Base numerology may be a reference numerology. The reference numerology may be fixed as 15 kHz subcarrier spacing in normal CP, and may be derived from synchronization signals or configured by higher layer.

Base numerology may be a numerology used for eMBB or configured by higher layer.

Base numerology may be prefixed per frequency band (e.g. 15 kHz subcarrier spacing for 700 MHz frequency band, 30 kHz subcarrier spacing for 3.5 GHz frequency band, 120 kHz subcarrier spacing for 28 GHz frequency band, etc.).

In the present invention, a subframe may be replaced with different names, e.g. a scheduling unit, TTI, or slot. The subframe may refer time duration of TTI which schedules common data, such as PBCH, SIB, random access response RAR, etc. In the present invention, (base) subframe, scheduling unit, TTI, or slot may be inter-changeable.

In addition to the subframe based on base numerology, for the convenience, there may be a mini-subframe based on base numerology. One example of defining a mini-subframe is that the mini-subframe may consist of OFDM symbols, whereas a subframe may consist of 14 OFDM symbols. Another example of defining a mini-subframe is that the mini-subframe is a unit of any configuration. For example, if TX/RX burst length and/or starting/ending of TX/RX burst and/or guard period (GP) duration are defined in a unit of OFDM symbol, then a mini-subframe may consist of 1 OFDM symbol. If the configuration is done at 2 OFDM symbols, then a mini-subframe may consist of 2 OFDM symbols. In other words, the mini-subframe may be a basic time resource unit to indicate any scheduling within a subframe.

For the subcarrier spacing larger than the base subcarrier spacing, a basic time resource unit may be defined by the same size of mini-subframe of base numerology in terms of absolute time. This basic time resource unit may be called as mini-slot. In other words, basic time resource unit for SC0*2 may be 2*number of OFDM symbols belonging to the mini-subframe based on base numerology.

Figure 5:
FIG. 5 shows an example of basic time resource units aligned at basic time resource unit level according to an embodiment of the present invention.
Figure 5:
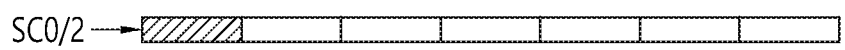
Figure 5:
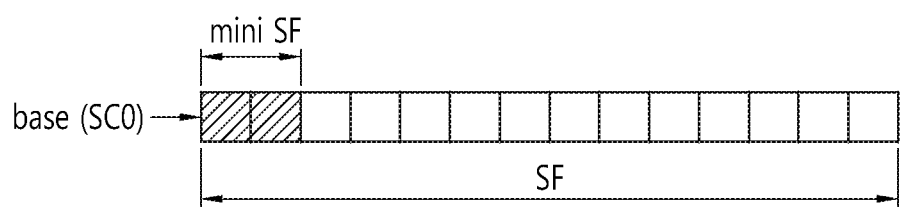
Figure 5:
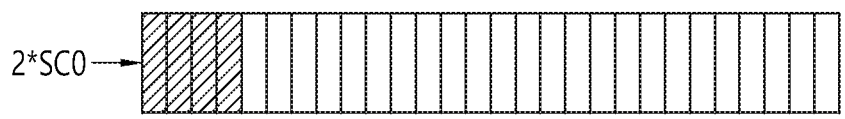
Figure 5:
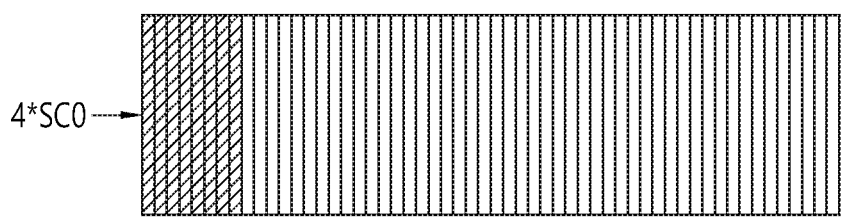

FIG. 5 shows an example of basic time resource units aligned at basic time resource unit level according to an embodiment of the present invention. Referring to FIG. 5, basic time resource unit of each subcarrier spacing may be m*SC0*2 OFDM symbols, assuming that mini-subframe consists of 2 OFDM symbols with base numerology. In other words, the mini-slot size (minimum) of each subcarrier spacing SCm may be m*2 (for mini-slot size of 2 OFDM symbols) or m (for mini-slot size of 1 OFDM symbol), where SCm=SC0*m. The basic time resource unit may be used for defining timing/configuration with different numerology from base numerology. In this sense, instead of mini-subframe, the basic time resource unit may also be used to represent the size of mini-subframe. Without introducing a new mini-subframe, the basic time resource unit BTRU may be one OFDM symbol.

As the base numerology may not be known to UE (e.g. URLLC UEs), the size of basic time resource unit may be configured to a UE from (2 OFDM symbols, 4 OFDM symbols, 8 OFDM symbols, 16 OFDM symbols, 14 OFDM symbols, 28 OFDM symbols . . . ).

Alternatively, the length of the basic time resource unit may be linearly scaled while keeping the same number of OFDM symbols.

Figure 6:
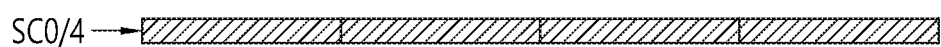
FIG. 6 shows an example of basic time resource units aligned at subframe level according to an embodiment of the present invention.
Figure 6:
Figure 6:
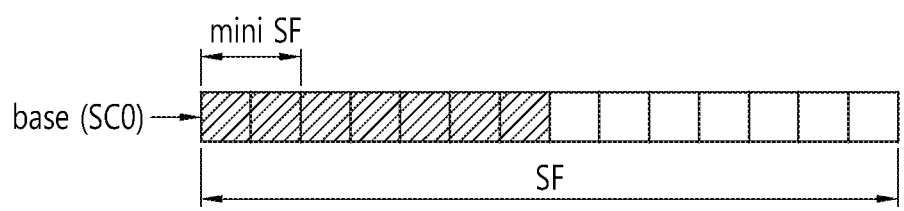
Figure 6:
Figure 6:
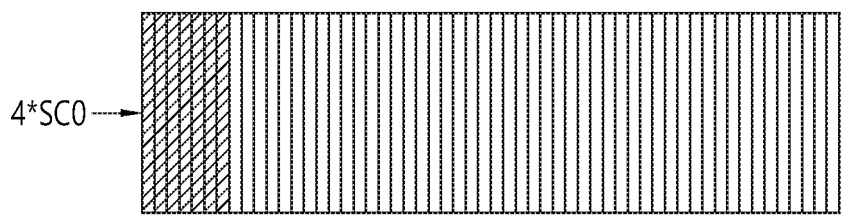

FIG. 6 shows an example of basic time resource units aligned at subframe level according to an embodiment of the present invention. Referring to FIG. 6, basic time resource unit of each subcarrier spacing has the same number of OFDM symbols, i.e. 7 OFDM symbols. Accordingly, the basic time resource unit of each subcarrier spacing is not aligned with each other at basic time resource unit level.

Regardless of whether either approach is used, multiplexing of different numerologies in time division multiplexing (TDM) manner may need to be clarified. At least one of the following options may be used.

(1) Numerology 'a' may be switched to numerology 'b' in unit of mini-subframe based on base numerology. This may not allow switching, e.g. from 4 OFDM symbols of 60 kHz subcarrier spacing to 2 OFDM symbols of 30 kHz subcarrier spacing if 15 kHz subcarrier spacing is used for base numerology and mini-subframe size is 2 OFDM symbols.

(2) Numerology switching may occur in the unit of 1 OFDM symbol or mini-subframe of given numerology. For example, if mini-subframe is defined per numerology (e.g. 7 OFDM symbols or 2 OFDM symbols based on the given numerology), numerology may be switched in any mini-subframe level. However, this may lead shifting of a given numerology. For example, if 7 OFDM symbols with 60 kHz subcarrier spacing is used, and then 7 OFDM symbols with 30 kHz subcarrier spacing is used, the starting time for 7 OFDM symbols with 30 kHz subcarrier spacing may not be aligned with 30 kHz frame structure. To overcome this issue, switching from numerology 'a' to numerology 'b' may occur based on mini-subframe of min {subcarrier spacing (a), subcarrier spacing (b)}. In other words, the unit size from switching numerology 'a' to numerology 'b' may be based on the mini-subframe size of the smallest subcarrier spacing of multiplexed numerologies. If 30, 60, 15 kHz subcarrier spacing are multiplexed, this approach may be equivalent to (1). However, as multiplexing may occur between two numerologies, this may lead to 14 OFDM symbols with 60 kHz subcarrier spacing, 7 OFDM symbols with 30 kHz subcarrier spacing, 7 OFDM symbols with 15 kHz subcarrier spacing in time domain.

(3) Candidate starting points for each numerology may be defined. The candidate starting points for each numerology may be determined based on the mini-subframe of each numerology. For example, 60 kHz subcarrier spacing, every 0.125 ms (or approximately 0.125 ms), 60 kHz subcarrier spacing may be deployed. 30 subcarrier spacing kHz, every 0.25 ms (approximately 0.25 ms), 30 kHz subcarrier spacing may be deployed, and so on. Though each numerology may end before the next starting position, unused resource may not be utilized. With this approach, 7 OFDM symbols with 60 kHz subcarrier spacing, unused resource, 7 OFDM symbols with 30 kHz subcarrier spacing, unused resource, 7 OFDM symbols with 15 kHz subcarrier spacing (0.125 ms with 60 kHz subcarrier spacing, 0.125 ms with 60 kHz subcarrier spacing unused, 0.25 ms with 30 kHz subcarrier spacing, 0.25 ms with 30 kHz subcarrier spacing unused, 0.5 ms with 15 kHz subcarrier spacing) is possible.

This is similar to time-resource block grid concept where scheduling resource block of each time may be defined per numerology, and may start in a fixed grid for simple multiplexing. Resource grid may be formed based on each numerology. However, resource grid may also be shifted.

For example, instead of wasting 0.125 ms after 60 kHz subcarrier spacing, 30 kHz subcarrier spacing may be started immediately. This will lead 0.125 ms shift of 30 kHz subcarrier spacing resource grid. In other words, time resource grid may start in any time whenever resource becomes available, which may lead misalignment. Alternatively, partial time-resource scheduling may be allowed. For example, if 7 OFDM symbols with 60 kHz subcarrier spacing is used, and 7 OFDM symbols with 60 kHz subcarrier spacing is left, 3 OFDM symbols with 30 kHz subcarrier spacing may be accommodated to the unused portion. This may lead resource fragmentation/waste. When 60 kHz subcarrier spacing and 15 kHz subcarrier spacing are multiplexed, 7 OFDM symbols with 60 kHz subcarrier spacing may be used within 2 OFDM symbols with 15 kHz subcarrier spacing with some resource waste. This implies that resource fragmentation may occur, though, basic scheduling of each numerology may occur following mini-subframe defined per each numerology.

(4) Alternatively, mini-subframe duration may be fixed per carrier. The mini-subframe duration may be configured by the network or derived from synchronization/common signals, etc. The mini-subframe duration of each numerology in terms of number of OFDM symbols may be defined per each numerology.

In the description above, the size of mini-subframe with either approach may be 2 or 7 (or multiple of 2).

In summary, the main purpose of subframe definition is to define timing reference for synchronization signals, PBCH and SIB transmissions. In this sense, it is natural that reference numerology defining subframe is the numerology used for synchronization signals, PBCH and possibly for SIB. Thus, only one reference numerology may be present per carrier. To minimize unnecessary UE complexity, numerology of synchronization signals may be fixed to a very limited set per frequency range (e.g. below 6 and above 6 GHz). This implies that numerology used for synchronization signals may be fixed per frequency range. However, at the same time, due to different delay spread requirement and latency requirement, it may be considered to adopt different numerology in the same frequency range. In this sense, it may be further considerable to differentiate numerology for synchronization signals and other transmissions such as PBCH/SIB and possibly unicast data. Alternatively, common data/signals and unicast data may utilize different numerology. If the scenario where common data and synchronization signals may utilize different numerology is supported, the reference numerology may be defined as the numerology used for common data transmission. Generally, reference numerology may be defined as the numerology used for common data transmission. The reference timing for synchronization signals may be based on 1 ms, thus, additional reference timing may not be necessary. For the numerology used for common data, it may be indicated by synchronization signals or may be fixed per frequency region.

Also, reference numerology for UL is numerology used for PRACH, Msg3, (possibly Acknowledgement/non-acknowledgement (ACK/NACK) transmission corresponding to Msg 4). Alternatively, separate numerology may be defined for PRACH, Msg3, though reference numerology for numerology alignment is based on the reference numerology. For other transmissions, different numerology may be defined. If different numerology is defined for eMBB, base numerology may follow numerology configured for eMBB UL (or base numerology may be explicitly configured, or basic time resource unit size for each numerology for UL may be separately configured). Unless explicitly configured, numerology used in DL may be used for UL as well. Subframe may be used as scheduling unit for common data transmission. Slot and mini-slot may be combined, and renamed as basic time resource unit. The basic time resource unit may be defined per numerology. The basic time resource unit size may include at least 2 OFDM symbols and 14 OFDM symbols. For some use cases, multiple of 14 OFDM symbols for the basic time resource unit size may be supported.

2. Mini-subframe/Slot Frame Structure (1) eMBB DL or UL control region or reserved resource may be considered. Particularly when DL control and UL control for eMBB UEs are rather fixed, it may be considered to avoid DL and/or UL control portions. This may be done in different ways. For example, the OFDM symbols used for eMBB DL/UL control region may be omitted from mini-slot construction. The reserved region size may be configured by the network or dynamically indicated by a common signaling. Alternatively, at least if URLLC and eMBB uses the same subcarrier spacing, frequency region in which UL/DL control can be transmitted may be reserved, and mini-slot in time-domain may be constructed without considering eMBB DL/UL region. In terms of mini-slot data/control mapping, it may be rate matched around eMBB DL/UL control regions. Alternatively, the starting position, duration of mini-slot frame structure within a slot or over multi-slots or over a subframe may be configured by the network. In general, a set of mini-slot patterns may be (pre)-configured, and one pattern may be selected by a common signal. Alternatively, the reserved resource (in time and/or frequency) not usable for mini-slot may be higher layer configured or dynamically indicated. The reserved resource may be used for control and/or RS transmission. Reserved resource may be present in discontinuous time and/or frequency resource.

(2) Sensing gap or indication gap or gap(s) may be considered. In constructing mini-slot, additional gap between mini-slots may be considered. The gap may be used for many purposes. For example, the gap may be used for sensing on on-going or high priority transmission. Or, the gap may be used for measurement, e.g. cross-link measurement transmission & measurement, indication signal transmission/reception. When eMBB UE transmits UL data, the eMBB UE may sense indication signal to check whether the next mini-slot can be transmitted or not. The positions of indication/sensing gap may be transmitted via a common signal in the reserved resource (e.g. first OFDM symbol in each slot or in every M slots, etc.). Based on the indication, mini-slot may be formed.

Alternatively, to minimize failure case of common signal reception, mini-slot may be formed regardless of indication/sensing gap, and the indication/sensing gap may be punctured. In other words, mini-slot frame structure may be formed without consideration of indication/sensing gap or invalid resource where indication/sensing gap can be constructed, via puncturing the resource within or across mini-slots. This gap may be generally unavailable or un-schedulable resource from mini-slot based scheduling perspective. In the gap, demodulation reference signal (DM-RS) and/or channel state information reference signal (CSI-RS) and/or synchronization signals, etc., may be transmitted which needs to be protected. More generally, mini-slot may be constructed around reserved OFDM symbols which are used for different purposes including sensing, indication gap, transmission of important signals/channels, etc.

Figure 7:
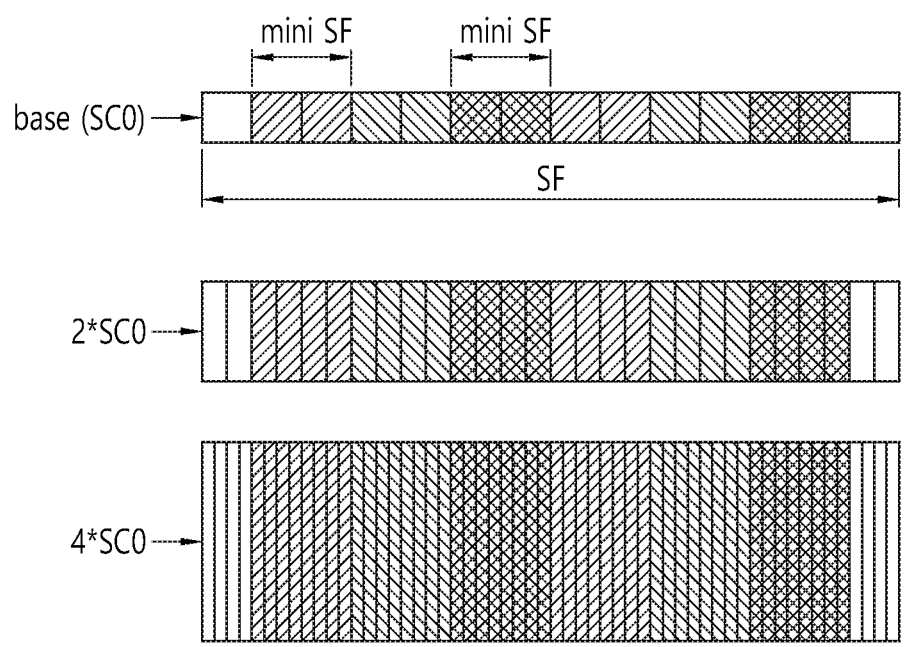
FIG. 7 shows an example of mini-slot frame structure according to an embodiment of the present invention.

FIG. 7 shows an example of mini-slot frame structure according to an embodiment of the present invention. Referring to FIG. 7, 1 OFDM symbol for base numerology is reserved in each 7 OFDM symbols for DL/UL control with different subcarrier spacing.

Figure 8:
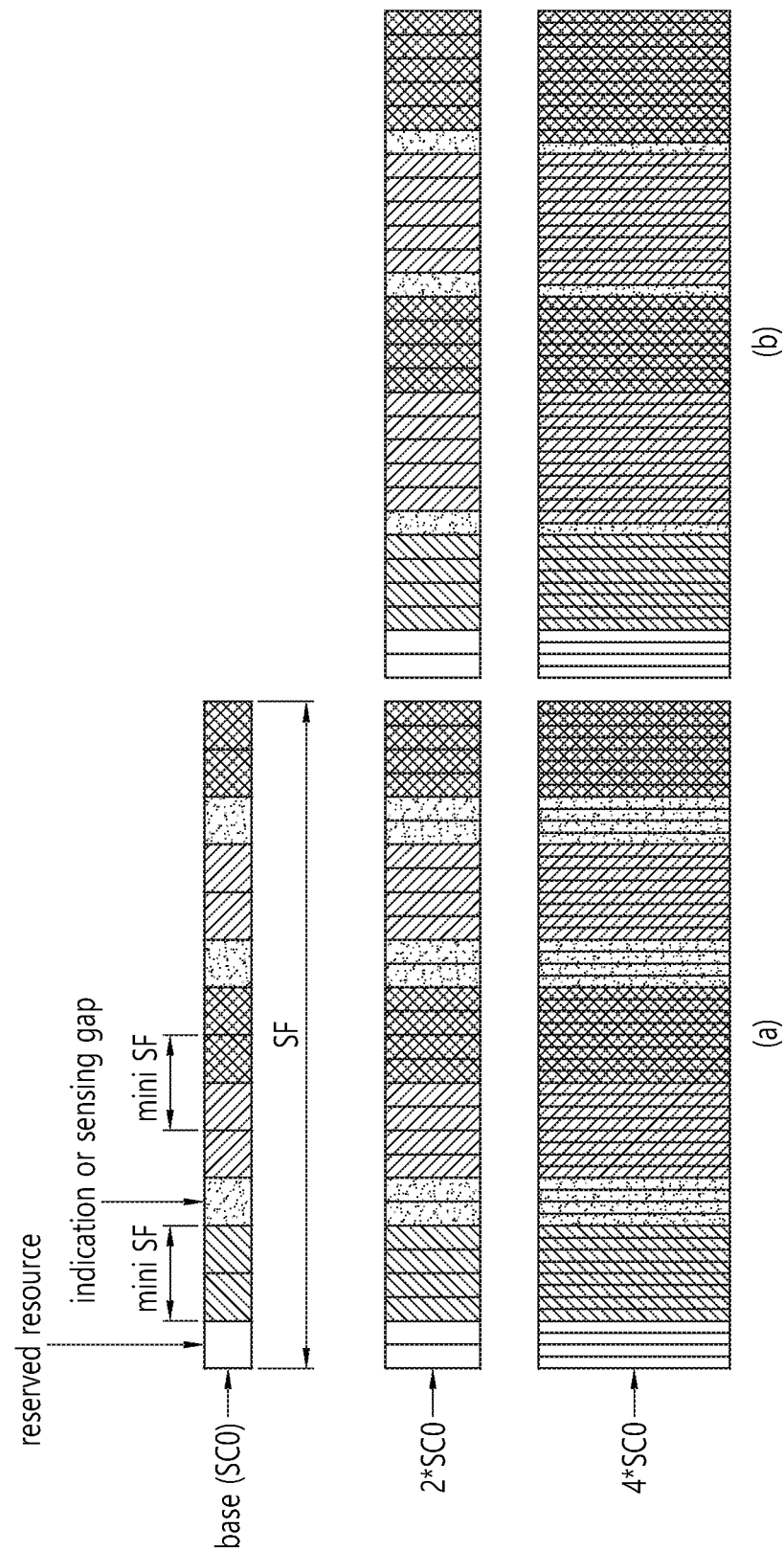
FIG. 8 shows another example of mini-slot frame structure according to an embodiment of the present invention.

FIG. 8 shows another example of mini-slot frame structure according to an embodiment of the present invention. Referring to FIG. 8, indication/sensing gap is configured between mini-slots. The indication/sensing gap may be configured based on base numerology (or aligned with eMBB numerology). Or, the indication/sensing gap may be configured per each numerology (e.g. 1 OFDM symbol based on the given numerology or used numerology for URLLC/eMBB, respectively), and the remaining OFDM symbols may be used for mini-slot combined with next or previous mini-slot. The reason of different size of mini-slot is to keep the alignment between different subcarrier spacing or numerologies. If the same number of OFDM symbols are used for indication/sensing gap in each numerology, it may become difficult to align different numerologies. In this sense, the gap size may be aligned between different numerologies if different numerologies are multiplexed, or the fixed OFDM symbol may be used for gap and different size of mini-slot may be used. FIG. 8-(a) shows a case that the indication/sensing gap is aligned at base numerology level. FIG. 8-(b) shows a case that the indication/sensing gap is fixed as m OFDM symbols per each numerology.

3. Case Apply to Different Examples

Depending on cases, the frame structure described above may be used, different RS pattern may be used. The following shows a few examples of utilizing different frame structure.

(1) Case 1: DL/UL Different Numerology or DL-UL/DL Different Numerology or Access/Backhaul Link Different Numerology More generally, this case may be described as a case where different numerologies are multiplexed in a carrier which requires dynamic resource sharing or different patterns of resource sharing. In this case, basic time resource unit based on base numerology may be used for determining pattern. For example, when DL uses 12 OFDM symbols, GP uses 1 OFDM symbol, and UL uses 2 OFDM symbols with 2*SC0 subcarrier spacing, the basic time resource unit may be 1 OFDM symbol. If the basic time resource unit is 2 OFDM symbols, the minimum size of UL may be at least 2 OFDM symbols, and one or a few basic time resource unit based on base numerology may be used for UL, and the actual number of OFDM symbols with UL numerology may be larger.

Figure 9:
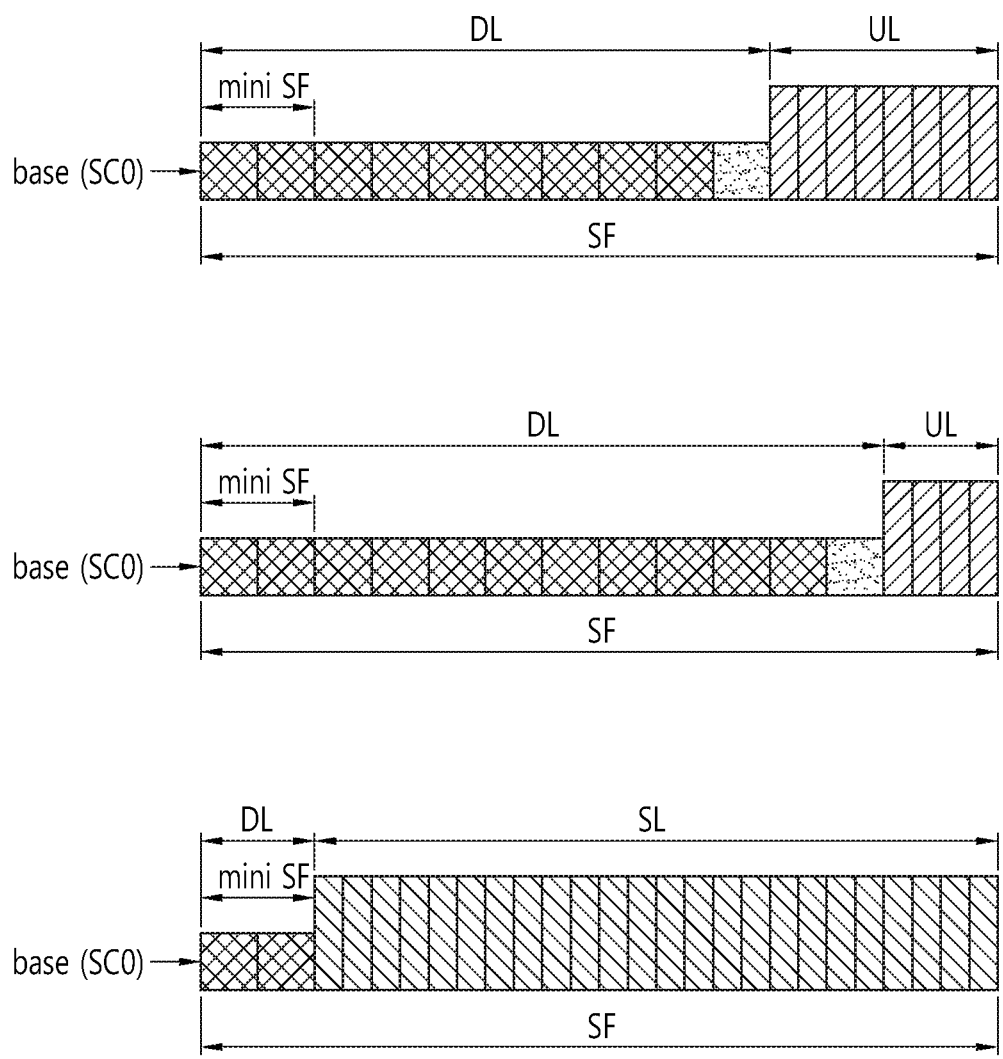
FIG. 9 shows an example of a basic time resource unit for different UL or different SL resource.

FIG. 9 shows an example of a basic time resource unit for different UL or different SL resource. Referring to FIG. 9, the basic time resource unit consists of 2 OFDM symbols.

Alternatively, the basic time resource unit of different numerology multiplexed in a carrier for UL, SL or different link or different usage scenario may be determined based on 1 OFDM symbol with base numerology, unless the basic time resource unit is explicitly configured. Different size of mini-subframe may present in a subframe. For example, a subframe may consist of multiple mini-subframes of size 1 OFDM symbol+2 OFDM symbols+2 OFDM symbols+2 OFM symbols+2 OFDM symbols+2 OFDM symbols+2 OFDM symbols+1 OFDM symbol.

(2) Case 2: Different Numerologies are Used in Different Carrier

For example, with CA or DC, carriers with different numerologies may be aggregated. In this case, mainly operations may be performed in each carrier independently. Thus, it is desirable to assume independent base numerology per each carrier. With this approach, subframe definition of each carrier may be independent from each other. With this approach, handling of cases where there are some dependency between two carriers (such as power headroom reporting (PHR), power control, cross-carrier scheduling, cross-carrier resource scheduling, etc.) may be treated as follows.

PHR: PHR may be indicated at PCell subframe level. If secondary cell (SCell) has more than one subframe within one PCell's subframe, any subframe may be used, or the first subframe may be used for PHR computation. If SCell has less than one subframe within one PCell's subframe, the subframe overlapped with PCell subframe may be used for PHR computation.

Power control: Even in CA, power control may be done at PCell subframe level. If SCell has more than one subframe within one PCell's subframe, the first overlapping subframe with PCell's subframe may be used for power control. Power for other SCell's subframes may be used within the remaining power (remaining power after allocating to PCell subframe).

Figure 10:
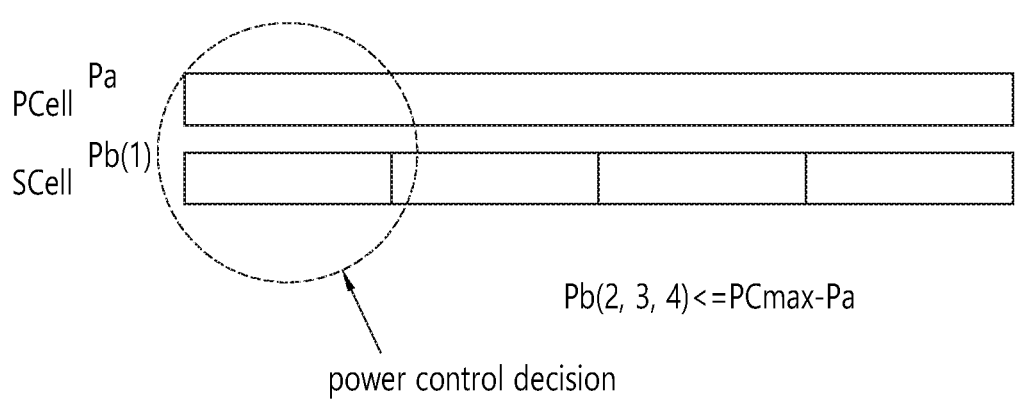
FIG. 10 shows an example of power control when different numerologies are used in different carrier according to an embodiment of the present invention.

FIG. 10 shows an example of power control when different numerologies are used in different carrier according to an embodiment of the present invention. Referring to FIG. 10, the power is defined at PCell subframe boundary, and the power of SCell of Pb(1) which is the first overlapped subframe of SCell is used for power control. The guaranteed power may be used. Between Pa and Pb(1), power control based on uplink control information (UCI) type, etc., may be used which is used for CA power control or DC power control. The power unused by PCell may be allocated for Pb(2), Pb(3), Pb(4), which are subframes overlapping with PCell subframe (but not the first subframe).

If SCell has less than one subframe within one PCell's subframe, the following approach can be considered. First, PCell subframe may be protected. In other words, transmission power on SCell may be reduced or dropped in order to guarantee the power that PCell has requested. Or, on-going transmission may always be prioritized so that PCell subframe which overlaps with SCell subframe which has already been allocated with power may not have sufficient power or PCell subframe power may be allocated with the maximum power—allocated power to SCell subframe, if there is SCell subframe which has already started the transmission at power control. Second, if more than one subframe of PCell overlap with SCell subframe (due to timing misalignment or subframe misalignment), the power to a subframe may be min (unused power from the previous PCell subframe, power which can be allocated between SCell subframe and next PCell subframe). In other words, on-going transmission may not be disturbed and the current subframe power control may be used between PCell next subframe and SCell subframe.

Cross-carrier scheduling: Cross-carrier scheduling between different numerologies may be disabled. Or, cross-carrier scheduling may be used with cross-subframe scheduling. If cross-subframe scheduling is used, scheduling carrier's subframe, which is overlapped with scheduled carrier's subframe n-k (which is scheduling subframe for subframe n with scheduled carrier's subframe definition) may transmit scheduling information. If there are more than one subframe of the scheduling carrier are present, the first subframe may be used. The timing/configuration may follow definition of scheduled carrier subframe or scheduling carrier subframe.

Cross-carrier resource configuration: Similar to cross-carrier scheduling, the configuration granularity may follow definition of either scheduling carrier subframe or scheduled carrier subframe.

4. DM-RS Pattern

With Case 1 described above, i.e. DL/UL different numerology or DL-UL/DL different numerology or access/backhaul link different numerology, details of basic time resource unit, DM-RS patterns, etc., are discussed.

The basic time resource unit may be used for the resource unit in time domain. Frequency of the resource unit may be defined by at least one of the following approaches.

(1) The same number of subcarriers may be used for the resource unit (i.e. 12 subcarriers may be used for the resource unit in frequency domain. Alternatively, to be aligned with LTE, the resource unit may use 12*4 subcarriers in frequency domain (or 12*2^1, where 1 can be 1, 2, 3 . . . ).

(2) The scaled number of subcarriers may be used for the resource unit (i.e. 6 subcarriers are used for the resource unit in frequency domain with SC0*2 subcarrier spacing). With this approach, the same number of REs is maintained within the resource unit regardless of subcarrier spacing.

(3) The scale number of subcarriers may be used for the resource unit, and depending on the basic time resource unit, the number of subcarriers with base numerology may be scaled up. For example, if the basic time resource unit consists of 1 OFDM symbol, the number of subcarriers in the resource unit with base numerology may be 16*12 subcarriers. If the basic time resource unit consists of 2 OFDM symbols, the number of subcarriers in the resource unit with base numerology may be 8*12 subcarriers. If the basic time resource unit consists of 7 OFDM symbols, the number of subcarriers in the resource unit with base numerology may be 4*12 subcarriers. With this scaled number of subcarriers, with different subcarrier spacing, linearly scaled number of REs in the resource unit may be assumed to maintain the same number of REs. If the basic time resource unit consists of 2 OFDM symbols, the number of subcarriers with SC0*4 may become 2*12=24.

(4) The resource unit may be defined by 'm' number of subcarriers and 'p' number of OFDM symbols (where m=8 or 16 (or 32, 64 . . . ), p=1, 2, 4, 8, 16 . . . ). Fixed number of m and p may be used regardless of numerology (e.g. m=8 and p=2). Or, fixed number of m and p may be scalable per numerology (e.g. m=8, p=2 for SC0, p=4 for SC0*2, p=8 for SC0*4). Or, Scalable number of m and p may be used (e.g. m=16, p=2 for SC0, m=8, p=4 for SC0*2, m=4, p=8 for SC0*4).

For more details, definition of the resource unit in a mini-subframe when different numerologies are multiplexed in a given carrier with a default subcarrier spacing of SCi are discussed. Hereinafter, the resource unit may be interchangeable with the resource block. The number of subcarriers of 16 for the resource unit may be replaced by 12 subcarriers for the resource unit without the loss of generality. Further, the resource unit may refer unit of DM-RS pattern, and multiple resource unit s may be used for scheduling unit. Or, the scheduling unit may be smaller than the resource unit.

When different numerologies are multiplexed in in-band case, the resource unit definition for a different numerologies multiplexed in the carrier may follow the same or different approach. As mentioned above, mini-subframe (which may consist of 2 or 7 OFDM symbols) may be used for unit of multiplexing to support TDM of different numerologies for larger subcarrier spacing compared to the default subcarrier spacing. In this case, one of the following options may be considered. In the below options, subcarrier spacing SCj is multiplexed in in-band on a carrier with a default subcarrier spacing SCi (SCj=SCi*n, n>0).

(1) Option 1: A resource unit consists of 16 subcarriers and 14 OFDM symbols (with normal CP) or 12 OFDM symbols (with extended CP). In this case, the same definition may be used in in-band case. If mini-subframe size is 2 OFDM symbols or smaller than 7 OFDM symbols (with normal CP) or 6 OFDM symbols (with extended CP), the resource unit of SCj may be defined as min {14, 14*n/(14/K)}. In other words, partial resource unit may be defined in a mini-subframe. For example, Option 1 may require the system bandwidth of a carrier with power of 2 (unless fractional resource unit is discarded). If system bandwidth is not power of 2 (e.g. 15 resource unit which may provide 3*4 resource units with n=4, and fractional ¾ resource unit is left), the fractional/remaining resource units may be discarded or rate matched. Similar approach may also be applied to DM-RS physical resource block (PRB) bundling with Option 2, which will be described below.

Figure 11:
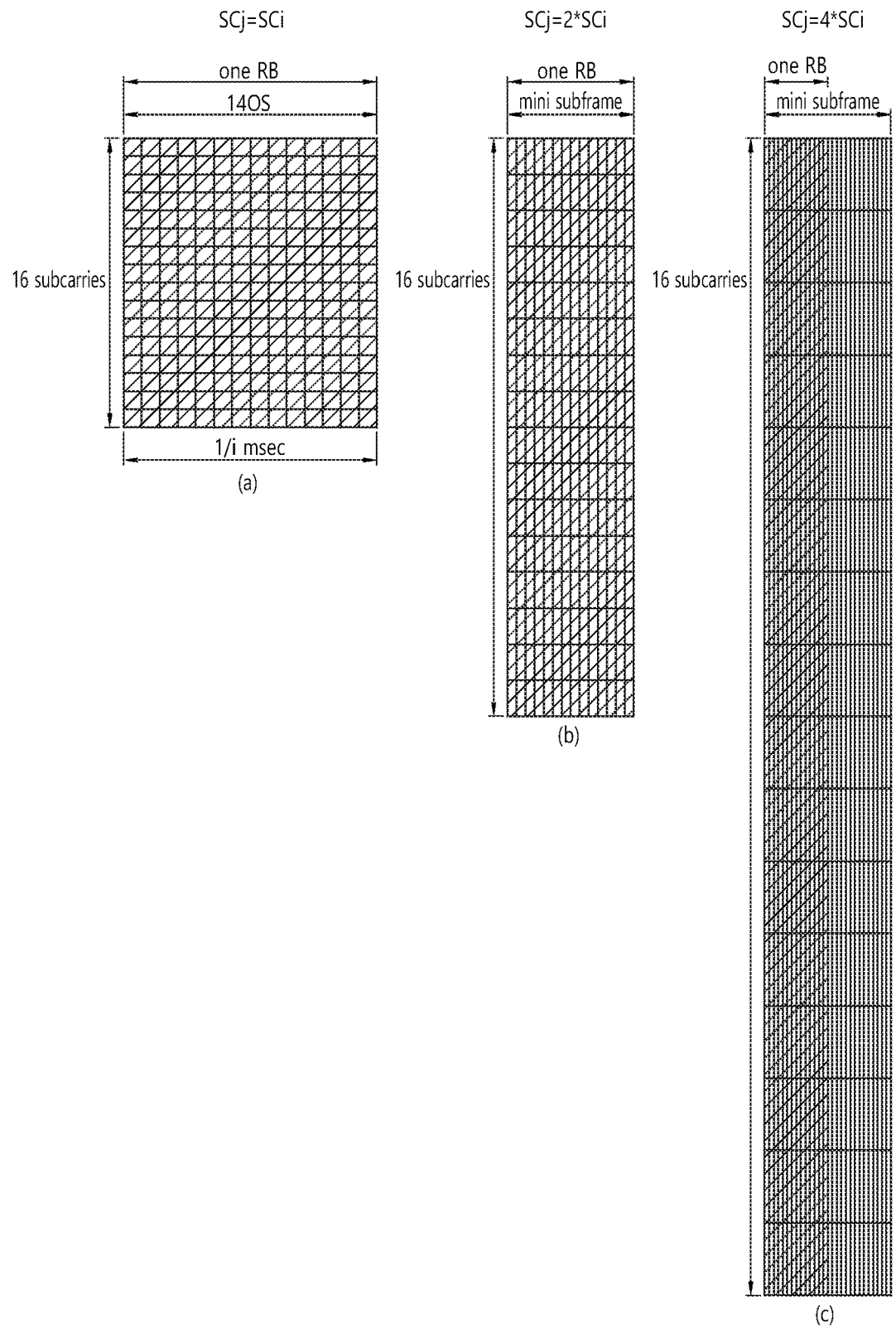
FIG. 11 shows an example of definition of resource units for different numerologies according to an embodiment of the present invention.

FIG. 11 shows an example of definition of resource units for different numerologies according to an embodiment of the present invention. Referring to FIG. 11, one resource unit consists of 16 subcarriers and 14 OFDM symbols, regardless of numerology. That is, the number of subcarriers and OFDM symbols are kept in a resource unit.

(2) Option 2: Time/frequency region of one resource unit of SCi is kept. That is, the same frequency/time region of resource unit of SCi is maintained, which requires different number of subcarrier spacing and number of OFDM symbols in one resource unit of SCj.

Figure 12:
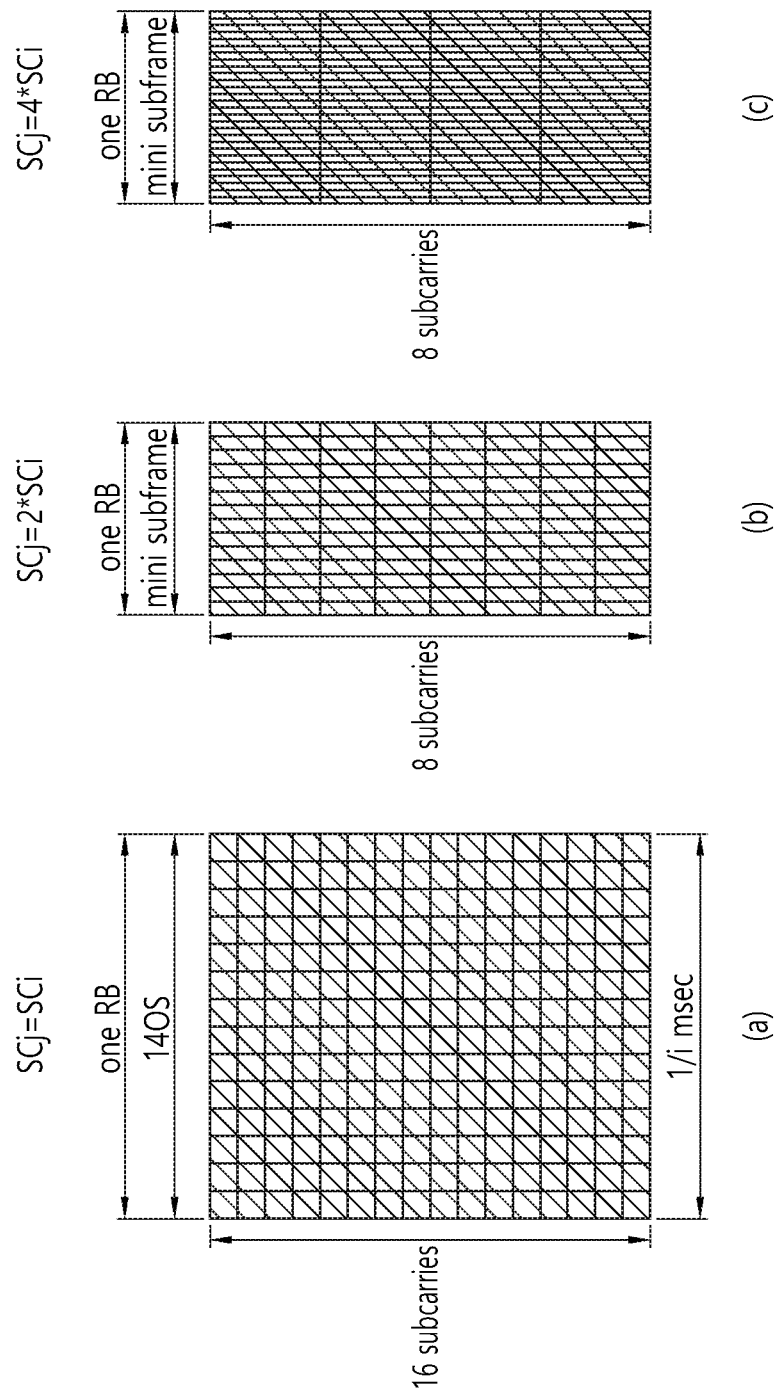
FIG. 12 shows another example of definition of resource units for different numerologies according to an embodiment of the present invention.

FIG. 12 shows another example of definition of resource units for different numerologies according to an embodiment of the present invention. Referring to FIG. 12, with SCi, i.e. default subcarrier spacing, one resource unit consists of 16 subcarriers and 14 OFDM symbols, and this time/frequency region is maintained. Accordingly, with SCj=2*SCi, one resource unit consists of 8 subcarriers and 14 OFDM symbols, which corresponds to mini-subframe, and with SCj=4*SCi, one resource unit consists of 4 subcarriers and 28 OFDM symbols, which corresponds to mini-subframe.

(3) Option 3: A resource unit consists of 16 subcarriers and (K*i) OFDM symbols. That is, frequency region is expanded and the same time duration of mini-subframe of the given carrier is kept. This option is similar to Option 1, and only one resource unit is defined even with SCj=4*SCi.

The definition of resource unit described above may also be applied to a resource block group (RBG).

Depending on mini-subframe size and multiplexing scenarios, different option may provide different benefits. Thus, further investigation may be necessary, considering also DM-RS and control/data design.

Figure 13:
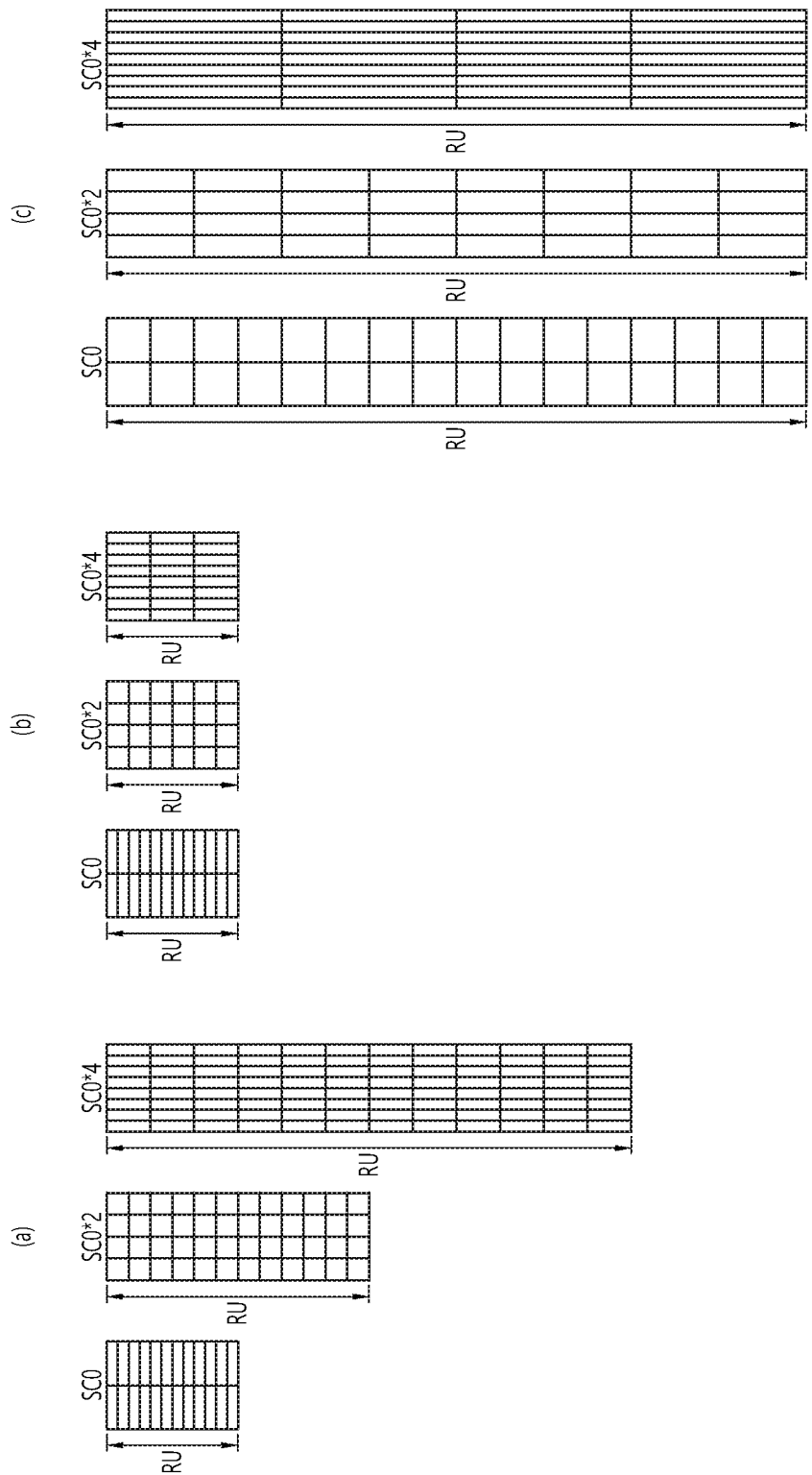
FIG. 13 shows another example of definition of resource units for different numerologies according to an embodiment of the present invention.

FIG. 13 shows another example of definition of resource units for different numerologies according to an embodiment of the present invention. Different basic time resource unit may be used for subcarrier spacing larger than the base numerology and smaller than the base numerology, respectively. FIG. 13-(a) shows approach 1, which is a case that the number of REs per each numerology increases as the subcarrier spacing increases. That is, the number of subcarriers in one resource unit is maintained. FIG. 13-(b) shows approach 2, which is a case that the number of REs per each numerology is maintained even though the subcarrier spacing increases. That is, the number of subcarriers in one resource unit decreases as the subcarrier spacing increases. FIG. 13-(c) shows approach 3, which is similar to approach 2.

Depending on definition of resource unit, different RS pattern may be considered. DM-RS pattern may be defined per resource unit.

Figure 14:
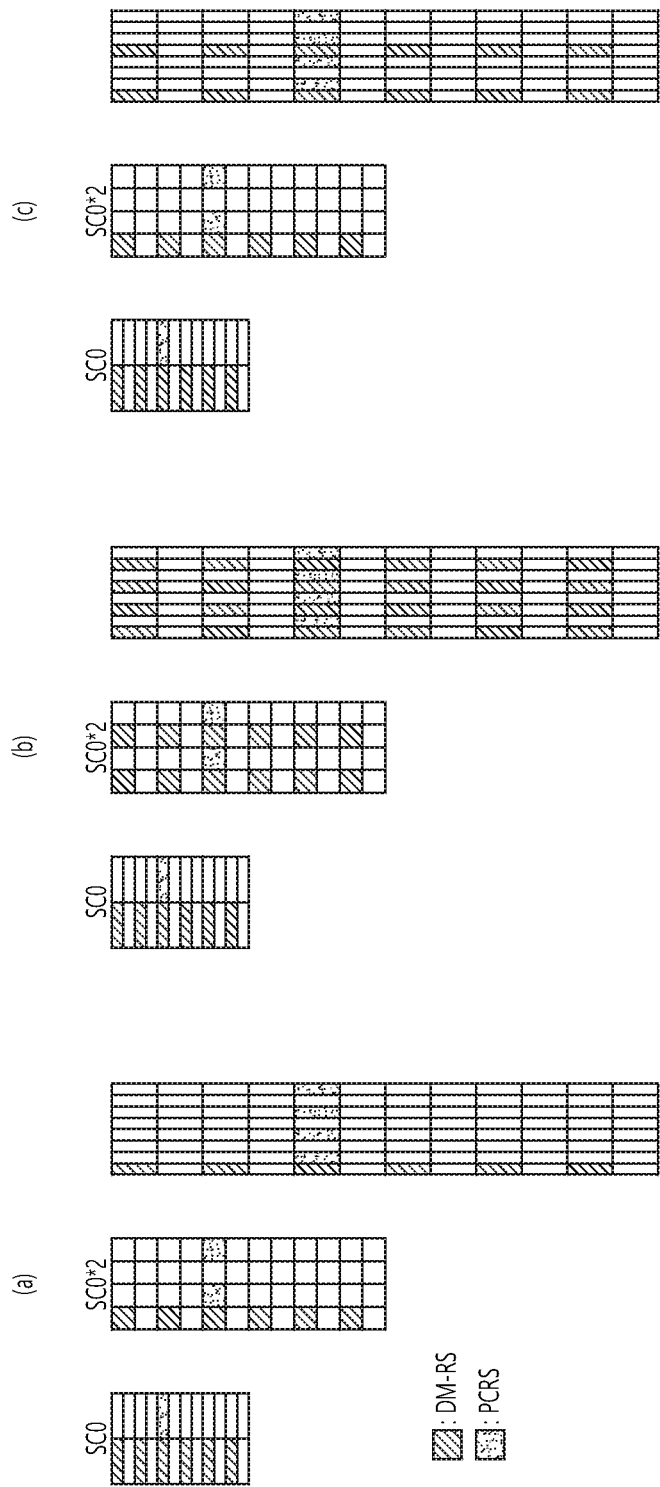
FIG. 14 shows an example of DM-RS pattern according to an embodiment of the present invention.

FIG. 14 shows an example of DM-RS pattern according to an embodiment of the present invention. This embodiment shows DM-RS pattern if approach 1 described above is used, i.e. the number of REs per each numerology increases as the subcarrier spacing increases. In option 1 of FIG. 14-(a), the same DM-RS pattern may be in the same resource unit regardless of subcarrier spacing. The physical cell RS (PCRS), which may be transmitted in 'x' number of resource units with base numerology, may be transmitted in 'x/m' number of resource units with scaled numerology of SC0*m or 'x' number of resource units. In option 2 of FIG. 14-(b), the same DM-RS pattern is repeated in every k OFDM symbols, which is the size of the basic time resource unit with base numerology. In other words, basic DM-RS pattern in the basic time resource unit may be defined which can be repeated in every k OFDM symbols with different subcarrier spacing. In option 3 of FIG. 14-(c), since repeating the same DM-RS pattern may increase the overall overhead, the same DM-RS pattern may be repeated in every P*k OFDM symbols. For example, P may be 2. P may be configured based on coherence time or may be prefixed depending on the subcarrier spacing (i.e. m). P may be a function of m (e.g. if m=2, P=2, if m=4 P=4, if m=8 P=4, etc.).

Also, P may be configured or may be defined based on the total system bandwidth or eNB/UE total power. For example, if the system bandwidth is not changed, the actual number of subcarriers in the system bandwidth may be reduced as the subcarrier spacing increases. This implies that the average power carried in a subcarrier may increase though the power may be reduced due to shorter OFDM symbol length. In that case, additional DM-RS may not be necessary as long as coherence time is within the basic time resource unit. As the coherence frequency may require denser DM-RS in frequency domain, thus, the frequency DM-RS density may follow subcarrier spacing regardless of the basic time resource unit. For time domain, if the power on one DM-RS RE is not reduced, DM-RS density in time domain may be kept as the same to base numerology. If the system bandwidth increases with subcarrier spacing, then average power on one DM-RS RE may be reduced due to shorter OFDM symbol length. In that case, increasing DM-RS density in time-domain should be considered. In such case, Option 2 or 3 may be used. If DM-RS density in frequency domain increases due to coherence frequency range, the average power on DM-RS may be reduced. In such case, increasing DM-RS density in time domain (e.g. Option 2 or 3) may also be considered.

Figure 15:
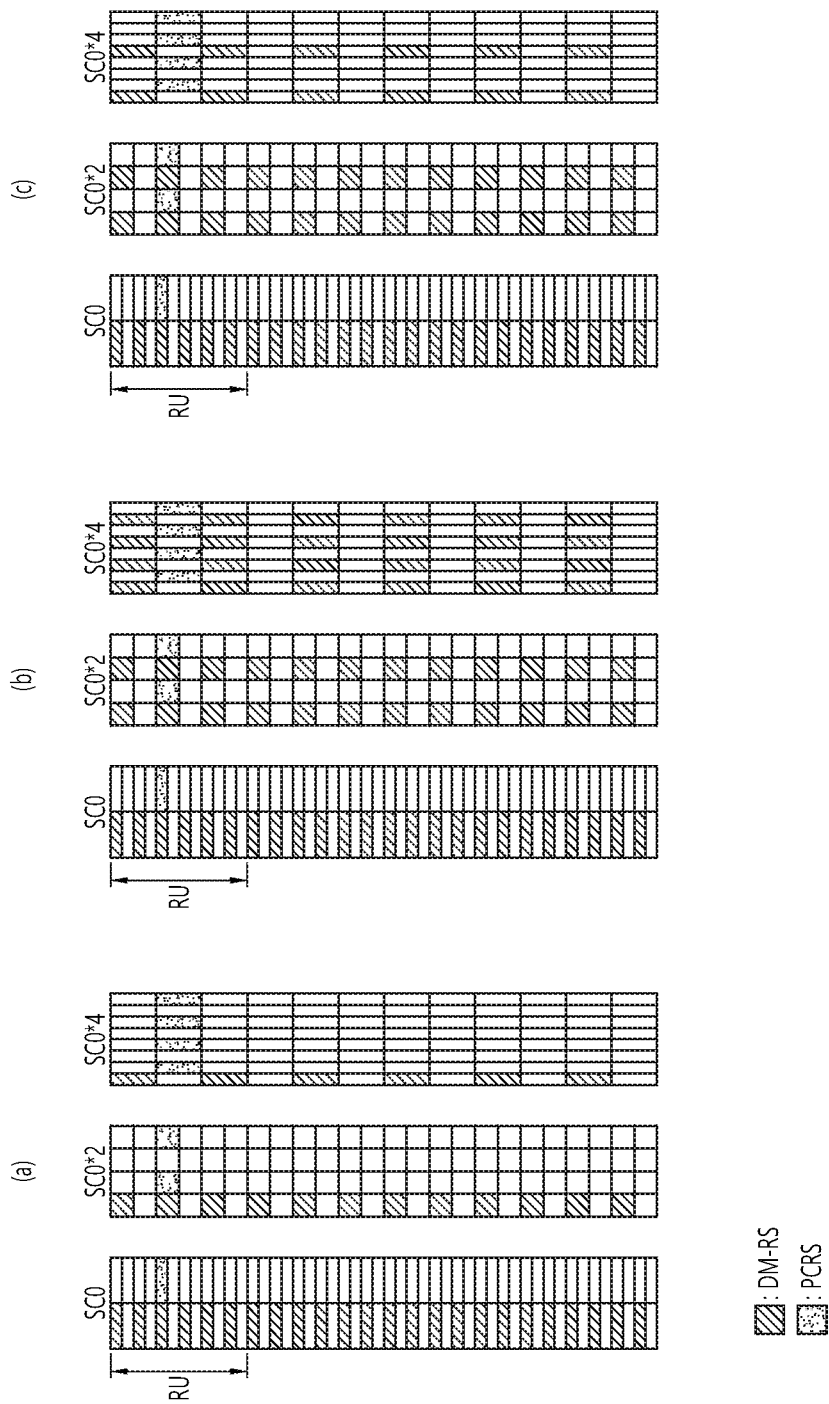
FIG. 15 shows another example of DM-RS pattern according to an embodiment of the present invention.

FIG. 15 shows another example of DM-RS pattern according to an embodiment of the present invention. This embodiment shows DM-RS pattern if approach 2 described above is used, i.e. the number of REs per each numerology is maintained even though the subcarrier spacing increases. The DM-RS pattern shown in FIG. 15 is similar to the DM-RS pattern shown in FIG. 14, except that different DM-RS pattern in each resource unit is changed.

Figure 16:
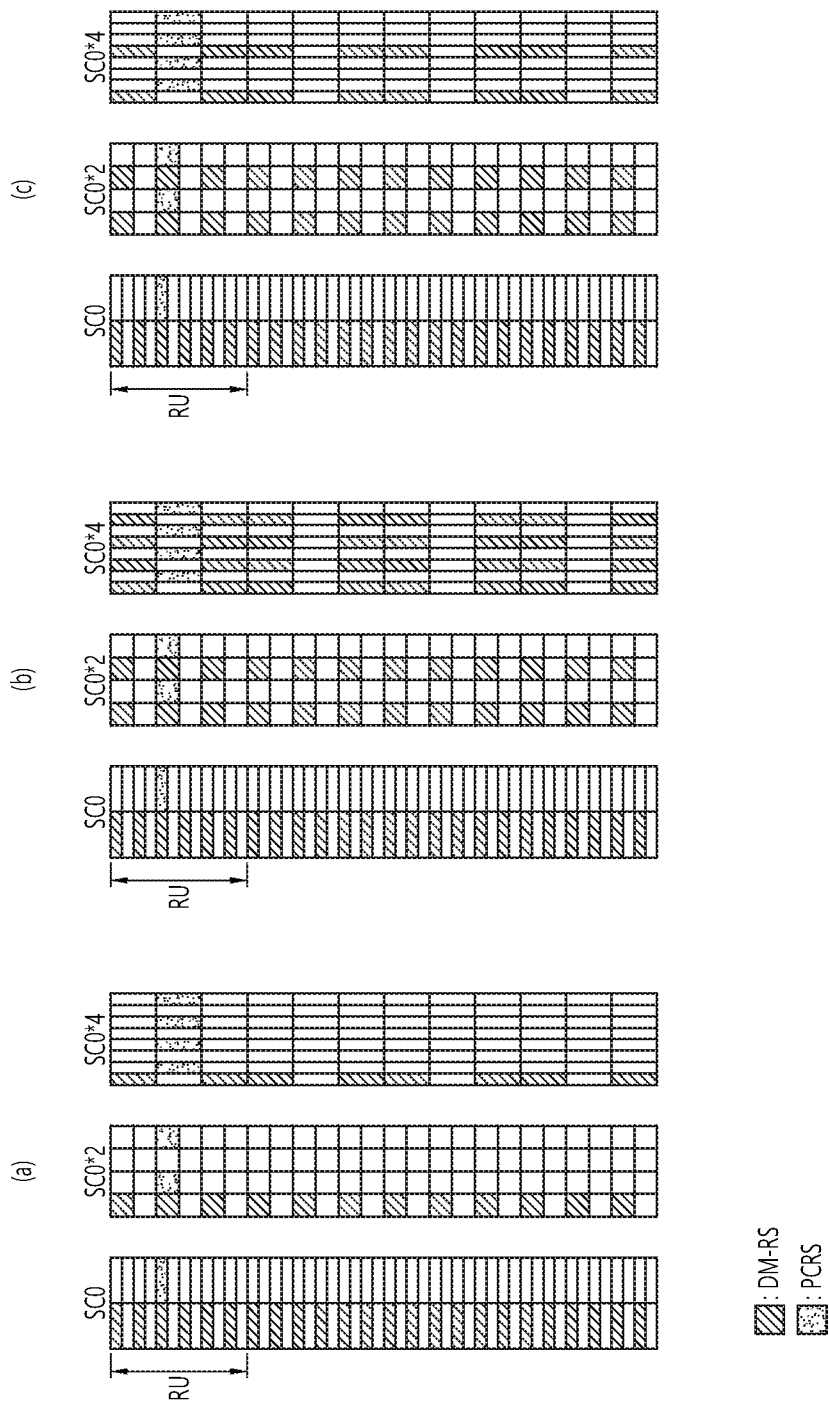
FIG. 16 shows another example of DM-RS pattern according to an embodiment of the present invention.

FIG. 16 shows another example of DM-RS pattern according to an embodiment of the present invention. In the DM-RS pattern shown in FIG. 16, the different DM-RS pattern is used, and DM-RS pattern of SC0*4 is repeated in 3 subcarriers.

With approach 3, similar DM-RS pattern shown in FIGS. 15 and 16 with approach 2 may be considered. Further, regardless of approach for resource unit definition, the independent DM-RS pattern may be considered.

More particularly, for DM-RS pattern, it is important to maintain 'n' number of DM-RS REs within frequency range of N, which may be determined by the network (via higher layer signaling) or prefixed. In other words, with base numerology subcarrier spacing SC0, if there are 'n' number of DM-RS REs in every K subcarriers, it may be necessary to scale up by 'n*m' in every K subcarriers to maintain the same coherent frequency. Thus, in addition to DM-RS patterns across OFDM symbols as shown above, there may be different options for frequency domain as follows.

(1) DM-RS may be placed in every "ceil" or "floor" (n/m) subcarrier for SCm =SC0*m within a resource unit. Depending on resource unit definition, DM-RS pattern may be different.

(2) DM-RS may be placed in every $2^q \leq floor$ (n/m), where q is the largest value. For example, with approach 3, the DM-RS pattern for base numerology may be assumed as n=6, then DM-RS may be placed in every 4 subcarriers, where q=2 to satisfy $2^2 \leq 6$. With SC0*2, q may become 1 (i.e. every 2 subcarrier spacing), and with SC*4, q may become 0 (i.e. every subcarrier spacing). This may allow scaling of DM-RS with scaled numerology. In other words, to maintain coherence bandwidth within a same frequency/carrier, the DM-RS density in frequency domain may be a function of power of two.

(3) If repetition is used in time-domain for power, staggering DM-RS pattern may also be considered while keeping the same density in frequency domain. In other words, in every repetition, staggered DM-RS pattern (such as (k+o) % RU_SC#) may be used. The offset 'o' may be determined based on the repetition factor (P or based on the basic time resource unit) and the required coherence frequency bandwidth. For example, if it is repeated in every basic time resource unit, for SC0*2, the offset may be "floor (n/2)" and for SC0*4, the offset may be floor (n/4). If it is repeated with factor P, the offset may be floor (n/m)*P. The intention is to uniformly distribute DM-RS in time/frequency regions as much as possible. As n/m can be smaller than 1, the offset may be "floor (n/m*P)".

Figure 17:
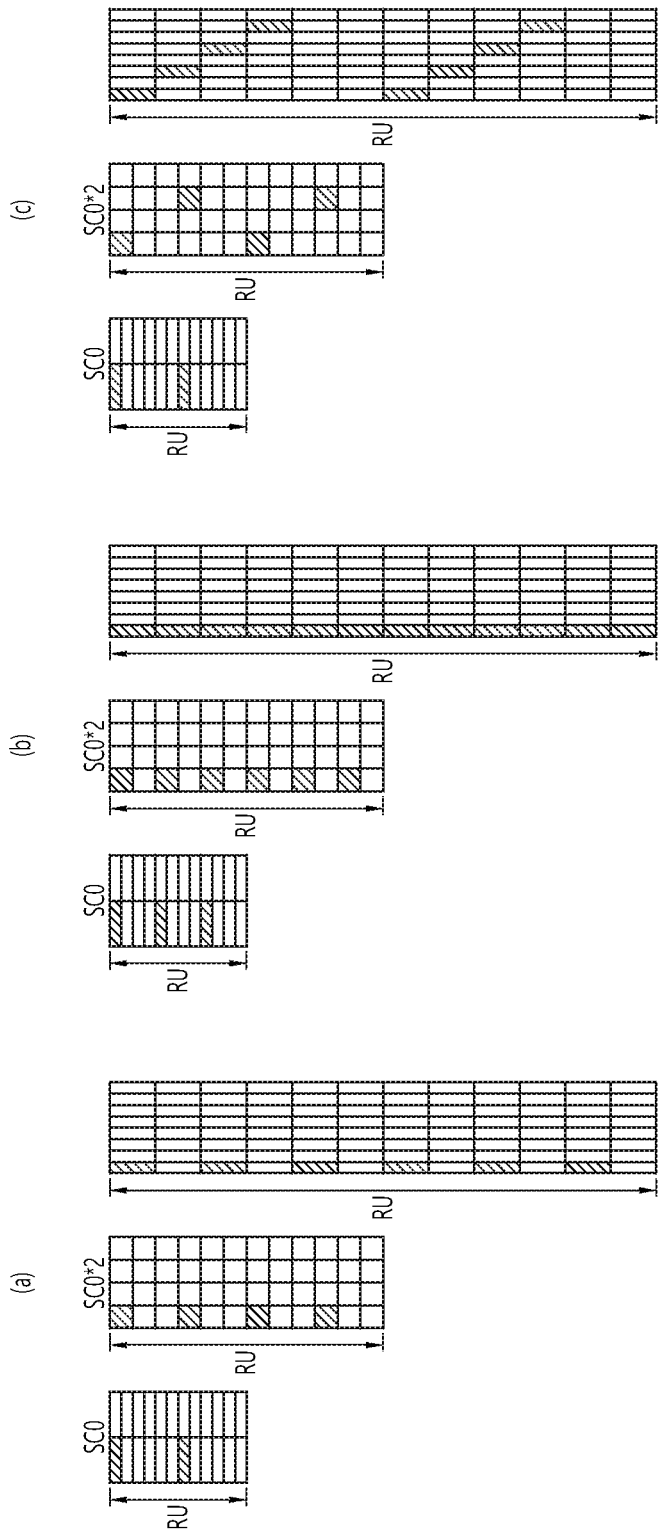
FIG. 17 shows another example of DM-RS pattern according to an embodiment of the present invention.

FIG. 17 shows another example of DM-RS pattern according to an embodiment of the present invention. FIG. 17-(a) corresponds to option (1) described above, i.e. DM-RS is placed in every "ceil" or "floor" (n/m) subcarrier for SCm=SC0*m within a resource unit. FIG. 17-(b) corresponds to option (2) described above, i.e. DM-RS is placed in every $2^q \leq floor$ (n/m), where q is the largest value. FIG. 17-(c) corresponds to option (3) described above, i.e. staggering DM-RS pattern is used. In FIG. 17, PCRS is not shown for the convenience. If staggered/shifted DM-RS pattern collides with PCRS, PCRS may be omitted. Alternatively, PCRS may be present only in OFDM symbols where DM-RS is not present.

Similar concept may be applied to subcarrier spacing smaller than the base numerology subcarrier spacing. In such case, less dense DM-RS in frequency domain and higher dense DM-RS density in OFDM symbol domain may be considered.

However, DM-RS may not be present in the basic time resource unit with any numerology. For example, only PCRS may be present. The proposed DM-RS pattern may be used in the basic time resource unit where DM-RS is expected. In the basic time resource unit where DM-RS is not expected, no DM-RS may also be used. Furthermore, different DM-RS pattern depending on usage scenario may be further considered. For example, the DM-RS patterns mentioned in the present invention may be used between eMBB and URLLC multiplexing in a same carrier, whereas different DM-RS pattern between DL-UL and sidelink may be used as they may require different coherent frequency/time regions.

To simplify the design, simply a base DM-RS pattern may be used based on base numerology which may be different depending on usage scenarios, operation mode, waveform, etc. Based on the base DM-RS pattern, different DM-RS pattern mentioned in the present invention may be adopted when different numerology/subcarrier spacing is multiplexed in a single carrier. Different base DM-RS patterns may be used in a different carrier with different size of the basic time resource unit. For example, in case of CA, the basic time resource unit may be 1 subframe rather than 1 OFDM symbol or 2 OFDM symbols or mini-subframe. The base DM-RS pattern may be defined by channel mode, maximum speed and/or carrier frequency.

The necessity or presence of DM-RS in the basic time resource unit may depend on the actual scheduling. For example, it may be assumed that the host carrier uses 15 kHz subcarrier spacing with normal CP, whereas URLLC uses with 60 kHz subcarrier spacing with normal CP. If the basic time resource unit (i.e. the minimum size where different numerology or other services can be multiplexed) is 2 OFDM symbols, then it means that in every 2 OFDM symbols, different service or scheduling can be possible. If the host carrier schedules based on the basic time resource unit, it means that a UE may also be scheduled at mini-subframe with 15 kHz subcarrier spacing with normal CP. If mini-subframe scheduling is possible, it is likely that DM-RS may be present in every basic time resource unit. In such case, base DM-RS pattern may be present in every basic time resource unit or mini-subframe. If mini-subframe with 15 kHz subcarrier spacing with normal CP is not used, URLLC scheduling based on the basic time resource unit may need DM-RS in every basic time resource unit, and DM-RS pattern for URLLC may be derived from 15 kHz subcarrier spacing with normal CP base DM-RS sequence in the basic time resource unit. If base DM-RS pattern for a subframe is different from DM-RS pattern for the basic time resource unit with base numerology, base DM-RS pattern for the basic time resource unit may be used for different numerology multiplexed in the basic time resource unit level.

Figure 18:
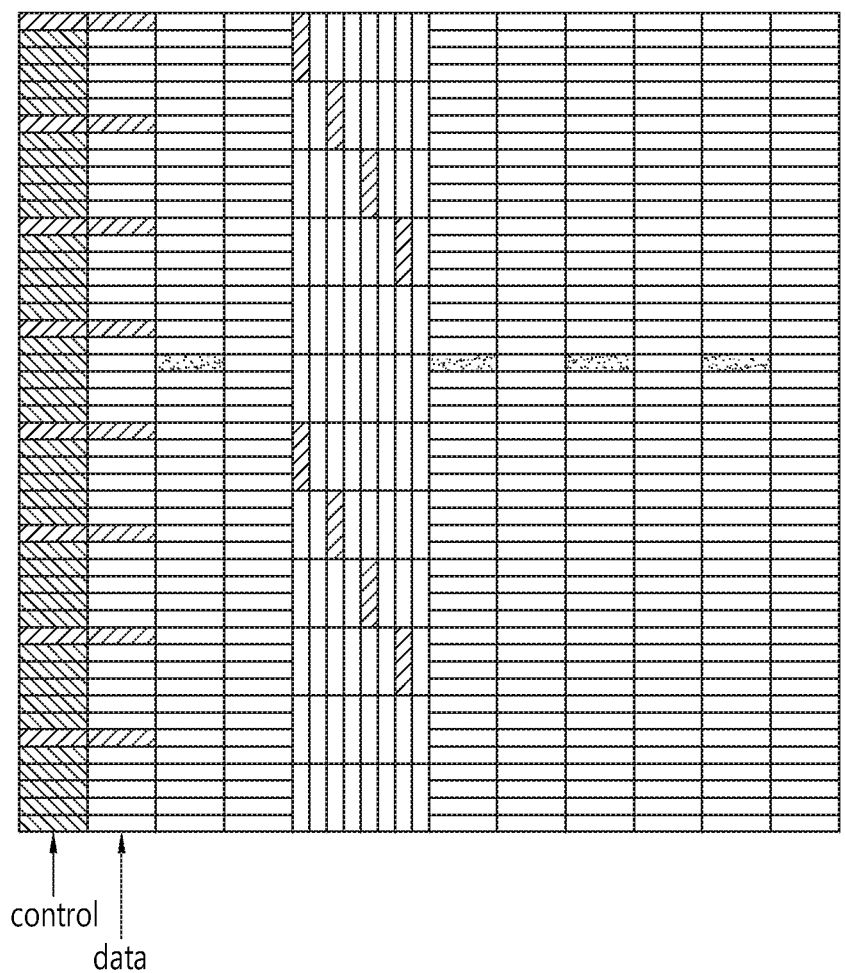
FIG. 18 shows another example of DM-RS pattern according to an embodiment of the present invention.

FIG. 18 shows another example of DM-RS pattern according to an embodiment of the present invention. Referring to FIG. 18, different services are multiplexed.

The similar rules may be applied to cases where different numerologies are used in the same frequency (i.e. base numerology is different). In such case, base DM-RS pattern may be designed based on a default numerology (e.g. 15 kHz subcarrier spacing), which may be used to derive DM-RS pattern with a new numerology or subcarrier spacing. For example, if DM-RS pattern is defined per slot and the basic time resource unit is a slot, the different DM-RS pattern with different numerology may be defined according one or a few rules of the above.

The resource unit may be defined by 'm' number of subcarriers and 'p' number of OFDM symbols, i.e. with the same number of REs (in frequency domain) in resource unit regardless of subcarrier spacing/numerology. In this case, the same number of REs for DM-RS may also be considered. The number of REs for DM-RS in one OFDM symbol may be kept as same regardless of numerology (in case multiplexing), and DM-RS may be repeated m times over time-domain, where SCm=SC0*m. Repetition over time domain may or may not be applied depending on the power spectral density at each RE of DM-RS.

Figure 19:
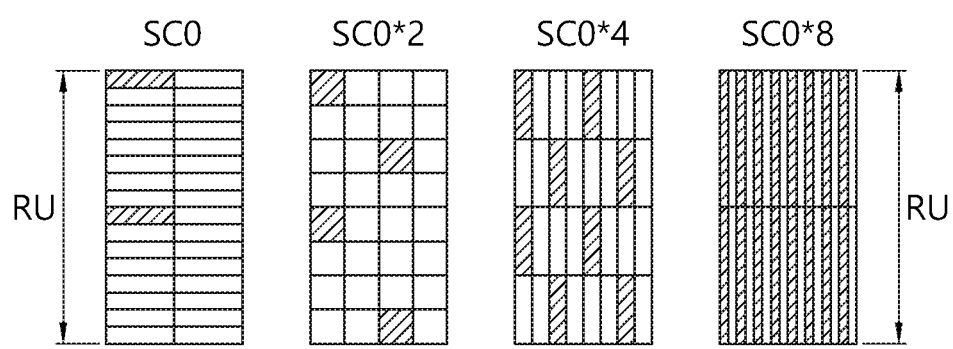
FIG. 19 shows another example of DM-RS pattern according to an embodiment of the present invention.

FIG. 19 shows another example of DM-RS pattern according to an embodiment of the present invention. Referring to FIG. 19, the number of REs for DM-RS in one OFDM symbol is kept as same regardless of numerology, and DM-RS is repeated over time-domain.

Figure 20:
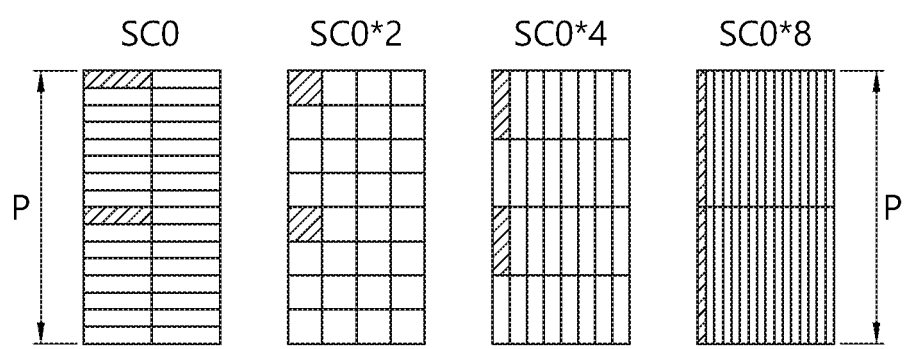
FIG. 20 shows another example of DM-RS pattern according to an embodiment of the present invention.

FIG. 20 shows another example of DM-RS pattern according to an embodiment of the present invention. Referring to FIG. 20, the number of REs for DM-RS in one OFDM symbol is kept as same regardless of numerology, but DM-RS is not repeated over time-domain.

Meanwhile, the first subcarrier may be mapped to first OFDM symbol, the second subcarrier may be mapped to the second OFDM symbol for mapping time/frequency location. In other words, the resource elements occupying the same time/frequency may be used interchangeably regardless of subcarrier spacing.

Figure 21:
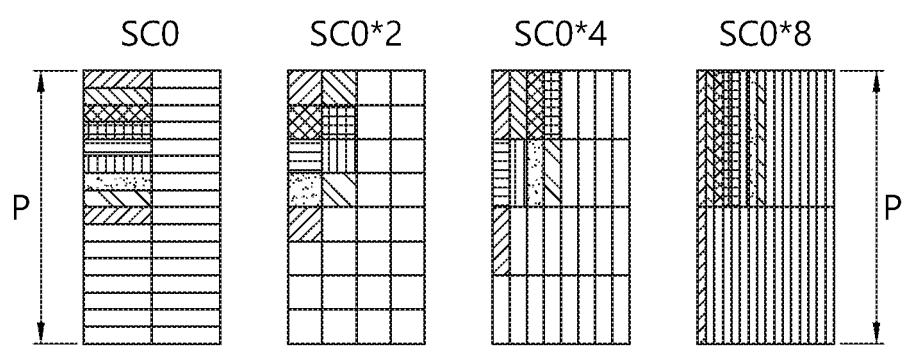
FIG. 21 shows another example of DM-RS pattern according to an embodiment of the present invention.

FIG. 21 shows another example of DM-RS pattern according to an embodiment of the present invention. Referring to FIG. 21, the same hatched RE may be mapped with the same RS or data (i.e. the mapping in SC0 in such REs may be mapped to each RE with the same hatching with different subcarrier spacing). By this way, DM-RS mapping may be scaled as long as repetition is not performed, while frequency region for resource unit is maintained. In terms of data mapping, the same RE mapping to SC0 may be used (by this way, data mapping with different subcarrier spacing may change in time-first partially and frequency-second if frequency first mapping is used with SC0) or data mapping may not be affected by this mapping, i.e. only DM-RS mapping utilizes this relationship.

The description above assumes single antenna port cases only. If there are multiple antenna ports, each single antenna port mapping may follow the approach mentioned in the present invention. Resource unit for mapping DM-RS may be multiple of resource block, thus, even with larger subcarrier spacing where relatively number of subcarriers is reduced, multiple antenna ports may be still supported in frequency division multiplexing (FDM) manner If code division multiplexing (CDM) or TDM is used with multiple antenna ports with SC0, each OFDM symbol may map to the same OFDM symbol index*i (Sci=i*SC0). However, some antenna ports may not be usable with larger subcarrier spacing due to lack of subcarriers if FDM is used. In such case, instead, TDM may be used in different OFDM symbols.

5. Power Control with Different Resource Unit Definition

If resource unit definition is based on approach 1, power control may be done by scaling 'm' and power control may be assigned based on the base numerology. In other words, power may be reduced by 'm' due to shorter OFDM symbol length, and power may be increased in each RE for frequency domain assuming that the same number of REs in a resource unit is used. If approach 2 or 3 is used, the same power may be used and the average power on each RE may be increased as the number of REs in a resource unit decreases as subcarrier spacing increases.

For power on DM-RS, depending on DM-RS pattern, the power may be determined. For example, if approach 1 is used, DM-RS energy per RE (EPRE) may be increased by 'm' (as the number of DM-RS REs in a resource unit decreases). If approach 2 is used, DM-RS EPRE may be maintained as the same. If approach 3 is used, some scaling factor based on P may be considered.

If a UE is power limited and thus cannot increase the DM-RS EPRE, different DM-RS pattern may be used. The use of different DM-RS pattern may be configured by the network based on UE measurement or may be selected by the UE autonomously, which may require blind detection at the receiver side. The similar approach may be applied to the network and the network may indicate which DM-RS pattern has been used. Or, depending on UE coverage, different DM-RS pattern may be used. In other words, between different DM-RS options, which option is used for a UE may be configured by higher layer signaling.

The power ratio between DM-RS and data RE may need to be maintained regardless of subcarrier spacing. For example, if DM-RS is power boosted about 3 dB compared to data, depending on DM-RS density or the ratio of DM-RS REs to data REs in an OFDM symbol, the power used for data may be different. Assuming constant power, the ratio may be dynamically adjusted by assuming DM-RS RE 3 dB boosting compared to data RE in data only OFDM symbol. That is, to maintain the total power as equal, the ratio of power carried over data REs in the OFDM symbol where DM-RS REs is present may be reduced. For example, if ratio of DM-RS RE to data RE in the DM-RS OFDM symbol is 1:1, to boost 3 dB on DM-RS, data Res may be de-boosted by -6 dB in the DM-RS OFDM symbol and by -3 dB in data OFDM symbol. If the ratio is 2:1, power de-boosting on data REs on DM-RS OFDM symbol may be further reduced.

However, maintaining the ratio between data RE and DM-RS may be desirable. So, it may be desirable to keep the same ratio of data REs to DM-RS REs in the scheduled resource units if power boosting on DM-RS is not used.

Figure 22:
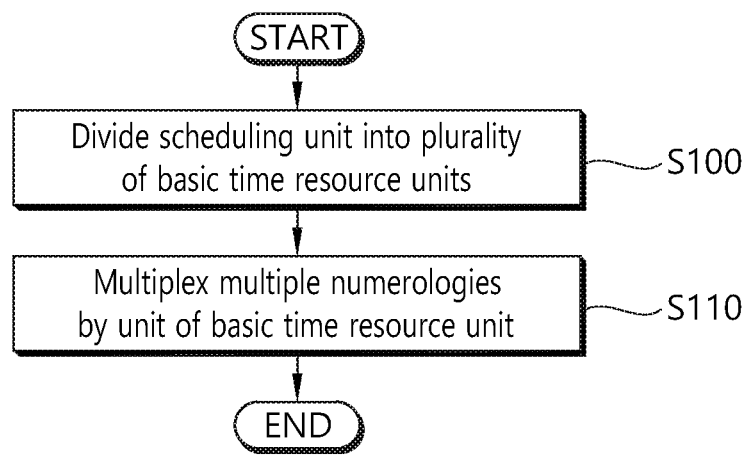
FIG. 22 show a method for multiplexing different numerologies by a network node according to an embodiment of the present invention.

FIG. 22 show a method for multiplexing different numerologies by a network node according to an embodiment of the present invention. The present invention described above may be applied to this embodiment.

In step S100, the network node divides a scheduling unit into a plurality of basic time resource units in time domain. In step S110, the network node multiplexes multiple numerologies by unit of a basic time resource unit.

The scheduling unit may be one of a subframe, a TTI, or a slot. The scheduling unit may be a time duration for common data, which includes at least one of PBCH, SIB, or RAR.

The multiple numerologies may include a reference numerology. The reference numerology may be configured per carrier. The reference numerology may be a numerology used for delivery of at least one of PBCH or system information. The multiple numerologies may correspond to multiple types of services.

The basic time resource unit may be configured per numerology. A size of the basic time resource unit may include at least 2 OFDM symbols.

Cross-carrier scheduling between the multiple numerologies may be configured. A timing or a configuration may follow a subframe definition of a scheduling carrier in the cross-carrier scheduling or a subframe definition of a scheduled carrier in the cross-carrier scheduling.

A resource unit for each of the multiple numerologies may consist of the same number of subcarriers and OFDM symbols regardless of the multiple numerologies. Or, a resource unit for each of the multiple numerologies may occupy the same time and frequency region. Different DM-RS pattern may be used depending on resource unit definition.

Figure 23:
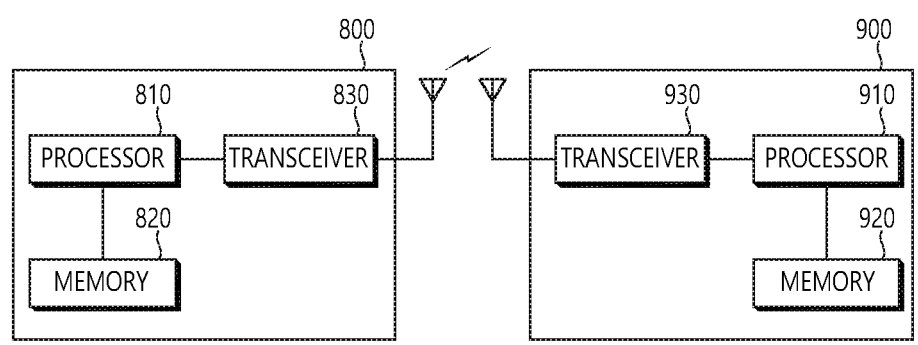
FIG. 23 shows a wireless communication system to implement an embodiment of the present invention.

FIG. 23 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a network node in a wireless communication system, the method comprising:
   scheduling data related to different subcarrier spacings in a subframe by a time resource unit; and
   communicating the data related to the different subcarrier spacings in the subframe,
   wherein a number of symbols in the time resource unit for each of the different subcarrier spacings linearly increases by a scaling factor as a subcarrier spacing for the time resource unit linearly increases by the scaling factor, and
   wherein a length of the time resource unit is maintained for the different subcarrier spacings.

2. The method of claim 1, wherein the subframe comprises at least one of a transmission time interval (TTI) or a slot.

3. The method of claim 1, wherein the data comprises at least one of a physical broadcast channel (PBCH), a system information block (SIB), or a random access response (RAR).

4. The method of claim 1, wherein the different subcarrier spacings include a reference numerology.

5. The method of claim 4, wherein the reference numerology is configured per carrier.

6. The method of claim 4, wherein the reference numerology is a numerology used for delivery of at least one of physical broadcast channel (PBCH) or system information.

7. The method of claim 1, wherein the time resource unit is configured per numerology.

8. The method of claim 1, wherein a size of the time resource unit includes at least 2 orthogonal frequency division multiplexing (OFDM) symbols.

9. The method of claim 1, wherein the different subcarrier spacings are related to multiple types of services.

10. The method of claim 1, wherein a cross-carrier scheduling between the different subcarrier spacings is configured.

11. The method of claim 10, wherein a timing or a configuration follows a subframe definition of a scheduling carrier in the cross-carrier scheduling or a subframe definition of a scheduled carrier in the cross-carrier scheduling.

12. The method of claim 1, wherein a resource unit for each of the different subcarrier spacings consists of the same number of subcarriers and orthogonal frequency division multiplexing (OFDM) symbols regardless of the different subcarrier spacings.

13. The method of claim 1, wherein a resource unit for each of the different subcarrier spacings occupy the same time and frequency region.

14. The method of claim 1, wherein different demodulation reference signal (DM-RS) pattern is used depending on resource unit definition.

15. A network node in a wireless communication system, the network node comprising:
    a memory;
    a transceiver; and
    at least one processor, coupled to the memory and the transceiver, configured to:
        schedule data related to different subcarrier spacings in a subframe by a time resource unit, and
        control the transceiver to communicate the data related to the different subcarrier spacings in the subframe,
    wherein a number of symbols in the time resource unit for each of the different subcarrier spacings linearly increases by a scaling factor as a subcarrier spacing for the time resource unit linearly increases by the scaling factor, and
    wherein a length of the time resource unit is maintained for the different subcarrier spacings.

\* \* \* \* \*